United States Patent
Pillai et al.

(10) Patent No.: US 9,530,052 B1
(45) Date of Patent: Dec. 27, 2016

(54) SYSTEM AND METHOD FOR SENSOR ADAPTATION IN IRIS BIOMETRICS

(71) Applicants: Jaishanker K. Pillai, College Park, MD (US); Maria Puertas-Calvo, Arlington, VA (US); Ramalingam Chellappa, Potomac, MD (US)

(72) Inventors: Jaishanker K. Pillai, College Park, MD (US); Maria Puertas-Calvo, Arlington, VA (US); Ramalingam Chellappa, Potomac, MD (US)

(73) Assignee: University of Maryland, College Park, MD (US)

( * ) Notice: Subject to any disclaimer, the term of this patent is extended or adjusted under 35 U.S.C. 154(b) by 476 days.

(21) Appl. No.: 14/209,042

(22) Filed: Mar. 13, 2014

Related U.S. Application Data

(60) Provisional application No. 61/780,462, filed on Mar. 13, 2013.

(51) Int. Cl.
    *G06K 9/00*     (2006.01)
    *G06K 9/62*     (2006.01)

(52) U.S. Cl.
    CPC ......... *G06K 9/00617* (2013.01); *G06K 9/0061* (2013.01); *G06K 9/00604* (2013.01); *G06K 9/6257* (2013.01)

(58) Field of Classification Search
None
See application file for complete search history.

(56) References Cited

U.S. PATENT DOCUMENTS

| | | | |
|---|---|---|---|
| 7,596,247 B2 * | 9/2009 | Ioffe | G06K 9/6296 340/5.53 |
| 8,369,595 B1 * | 2/2013 | Derakhshani | G06K 9/0061 382/117 |
| 8,483,450 B1 * | 7/2013 | Derakhshani | G06K 9/00597 382/115 |

(Continued)

OTHER PUBLICATIONS

J. K. Pillai, M. Puertas and R. Chellappa, "Cross-Sensor Iris Recognition through Kernel Learning," in IEEE Transactions on Pattern Analysis and Machine Intelligence, vol. 36, No. 1, pp. 73-85, Jan. 2014.*

(Continued)

*Primary Examiner* — Andrae S Allison
(74) *Attorney, Agent, or Firm* — Rosenberg, Klein & Lee

(57) ABSTRACT

The sensor adaptation technique applicable to non-contact biometric authentication, specifically in iris recognition, is designed to handle the sensor mismatch problem which occurs when enrollment iris samples and test iris samples are acquired with different sensors. The present system and method are capable of adapting iris data collected from one sensor to another sensor by transforming the iris samples in a fashion bringing the samples belonging to the same person closer than those samples belonging to different persons, irrespective of the sensor acquiring the samples. The sensor adaptation technique is easily incorporable into existing iris recognition systems and uses the training iris samples acquired with different sensors for learning adaptation parameters and subsequently applying the adaptation parameters for sensor adaptation during verification stage to significantly improve the recognition system performance.

20 Claims, 15 Drawing Sheets

(56) References Cited

U.S. PATENT DOCUMENTS

| | | | | |
|---|---|---|---|---|
| 8,675,925 | B2* | 3/2014 | Derakhshani | G06K 9/00597 382/115 |
| 8,718,362 | B2* | 5/2014 | Tuzel | G06K 9/72 382/170 |
| 8,724,857 | B2* | 5/2014 | Derakhshani | G06K 9/00597 382/117 |
| 8,787,628 | B1* | 7/2014 | Derakhshani | G06K 9/00597 382/115 |
| 9,224,042 | B2* | 12/2015 | Venkatesha | G06K 9/00604 |
| 2003/0118217 | A1* | 6/2003 | Kondo | G06K 9/00604 382/117 |
| 2014/0044321 | A1* | 2/2014 | Derakhshani | G06K 9/00597 382/117 |

OTHER PUBLICATIONS

L. Xiao, Z. Sun, R. He and T. Tan, "Coupled feature selection for cross-sensor iris recognition," Biometrics: Theory, Applications and Systems (BTAS), 2013 IEEE Sixth International Conference on, Arlington, VA, 2013, pp. 1-6.*
Zheng, Bo-Ren et al. "Cross-Sensor Iris Matching using Patch-based Hybrid Dictionary Learning." ICEIS (2014).*
K Q. Weinberger, F. Sha, and L. K. Saul, 2004, Learning a kernel Matrix for nonlinear dimensionality reduction, International Conference on Machine learning, pp. 839-846.*
Zheng et al, Heterogeneous Iris Recognition Using Heterogeneous Eigeniris and Sparse Representation, 2014 IEEE International Conference on Acoustic, Speech and Signal Processing (ICASSP).*
Xiao et al, Fusion of Iris and Periocular Biometrics for Cross-Sensor Identification, W.-S. Zheng et al. (Eds.): CCBR 2012, LNCS 7701, pp. 202-209, 2012.*
Proenca et al, Toward Noncooperative Iris Recognition—A Classification Approach Using Multiple Signatures, IEEE Transactions on Pattern Analysis and Machine Intelligence, vol. 29, No. 4, Apr. 2007.*
D. L. Woodard, S. Pundlik, P. Miller, R. Jillela and A. Ross, "On the Fusion of Periocular and Iris Biometrics in Non-ideal Imagery," Pattern Recognition (ICPR), 2010 20th International Conference on, Istanbul, 2010, pp. 201-204.*
K. W. Bowyer, et al., "Image Understanding for Iris Biometrics: A Survey," Computer Vision and Image Understanding, vol. 110, No. 2, pp. 281-307, 2008.
J. R. Matey and L. R. Kennell, "Iris Recognition—Beyond One Meter," in Handbook of Remote Biometrics (M. Tistarelli, S. Z. Li, and R. Challeppa, eds), Advances in Pattern Recognition, pp. 23-59, Springer London, 2009.
K. W. Bowyer, et al., "Factors that degrade the match distribution in iris biometrics," Identify in the Information Society, vol. 2, No. 3, pp. 327-343, 2009.
R. Connaughton, et al., "A Cross-Sensor Evaluation of Three Commercial Iris Cameras for Iris Biometrics," in IEEE Computer Society Workshop on Biometrics, pp. 97-104, 2011.
J. G. Daugman, "High Confidence Visual Recognition of Persons by a Test of Statistical Independence," IEEE Transactions on Pattern Analysis and Machine Intelligence, vol. 15, No. 11, pp. 1148-1161, 1993.
K. W. Bowyer, et al., "A Survey of Iris Biometrics Research: 2008-2010," in Handbook of Iris Recognition (M. J. Burge and K. W. Bowyer, eds), pp. 15-54, 2013.
A. Ross and A. K. Jain, "Biometric Sensor Interoperability: A Case Study in Fingerprints," in International ECCV Workshop on Biometric Authentication, pp. 134-145, May 2004.
F. Alonso-Fernandez, et al., "Sensor Interoperability and Fusion in Fingerprint Verification: A Case Study using Minutiae and Ridge-Based Matchers," in 9th International Conference on Control, Automation, Robotics and Vision, pp. 422-427, 2006.
F. Alonso-Fernandez, et al., "Quality-Based Conditional Processing in Multi-Biometrics: Application to Sensor Interoperability," IEEE Transactions on Systems, Man and Cybernetics, vol. 40, No. 6, pp. 1168-1179, 2010.
P. J. Phillips, et al., "An Introduction to Evaluating Biometric Systems," Computer, vol. 33, pp. 56-63, 2000.
E. Gonzalez, et al., "Looking for hand biometrics interoperability," in Hand-Based Biometrics (ICHB), 2011 International Conference on, pp. 1-6, 2011.
R. Connaughton, et al., "A Multi-Algorithm Analysis of Three Iris Biometric Sensors," IEEE Transactions on Information Forensics and Security, vol. 7, No. 3, pp. 919-931, 2012.
S. S. Arora, et al., "On Iris Camera Interoperability," in IEEE International Conference on Biometrics: Theory, Applications and Systems, pp. 346-352, 2012.
T. Hofmann, et al., "Kernel Methods in Machine Learning," The Annals of Statistics, vol. 36, No. 3, pp. 1171-1220, 2008.
B. E. Boser, et al., "A Training Algorithm for Optimal Margin Classifiers," in Conference on Learning Theory, pp. 144-152, 1992.
J. V. Davis, et al., "Information-Theoretic Metric Learning," in International Conference on Machine Learning, pp. 209-216, 2007.
K. Saenko, et al., "Adapting Visual Category Models to New Domains," in European Conference on Computer Vision, pp. 213-226, 2010.
H. V. Nguyen, et al. "Kernel dictionary learning," in International Conference on Acoustics, Speech and Signal Processing, 2012.
H. Lodhi, et al., "Text Classification using String Kernels," Journal of Machine Learning Research, vol. 2, No. 3, pp. 419-444, 2002.
S. V. N. Vishwanathan, et al., "Binet-Cauchy Kernels on Dynamical Systems and its Application to the Analysis of Dynamic Scenes," International Journal of Computer Vision, vol. 73, No. 1, pp. 95-119, 2007.
K. Q. Weinberger, et al., "Learning a Kernel Matrix for Nonlinear Dimensionality Reduction," in International Conference on Machine learning, pp. 839-846, 2004.
J. E. Prussing, "The Principal Minor Test for Semidefinite Matrices," Journal of Guidance, Control, and Dynamics, vol. 9, No. 1, pp. 121-122, 1986.
M. Belkin, et al., "Laplacian Eigenmaps and Spectral Techniques for Embedding and Clustering," in Advances in Neural Information Processing Systems, pp. 585-591, 2001.
S. T. Roweis and L. K. Saul, "Nonlinear Dimensionality Reduction by Locally Linear Embedding," Science, vol. 290, No. 5500, pp. 2323-2326, 2000.
S. J. Pan, et al., "Domain Adaptation via Transfer Component Analysis," in 21st International Joint Conference on Artificial Intelligence, pp. 1187-1192, 2009.
H. Daume III and D. Marcu, "Domain Adaptation for Statistical Classifiers," Journal of Artificial Intelligence Research, vol. 26, No. 1, pp. 101-126, 2006.
B. Kulis, et al., "Learning Low-Rank Kernel Matrices," in International Conference on Machine Learning, pp. 505-512, 2006.
L. Bregman, "The relaxation method of finding the common point of convex sets and its application to the solution of problems in convex programming," USSR Computational Mathematics and Mathematical Physics, vol. 7, No. 3, pp. 200-217, 1967.
Y. Lee, et al. "Improvements in Video-based Automated System for Iris Recognition (VASIR)," in Workshop on Motion and Video Computing, pp. 1-8, 2009.
Y. Lee, et al. "Robust Iris Recognition Baseline for the Grand Challenge," in National Institute of Standards and Technology Interagency/Internal Report, 2011.
VeriEye, http://www.neurotechnology.com/verieye.html.
C. M. Bishop, Pattern Recognition and Machine Learning (Information Science and Statistics). Springer, 1 ed., 291-323, 2007.
C.T. Chou, et al. "Iris recognition with multi-scale edge-type matching," in International Conference on Pattern Recognition, pp. 545, 548, 2006.
P. Yao, et al., "Iris recognition algorithm using modified log-gabor filters," in International Conference on Pattern Recognition, pp. 461-464, 2006.
D. M. Monro, et al., "Dct-based iris recognition," IEEE Transactions on Pattern Analysis and Machine Intelligence, vol. 29, No. 4, pp. 586-595, 2007.
W. W. Boles, et al., "A human identification technique using images of the iris and wavelet transform," IEEE Transactions on Signal Processing, vol. 46, No. 4, pp. 1185-1188, 1998.

(56) References Cited

OTHER PUBLICATIONS

J. Gan, et al., "Applications of wavelet packets decomposition in iris recognition," in International Conference on Biometrics, pp. 443-449, 2006.

T. Hoffman, et al., "Kernel method machine learning," annals of Statistics, vol. 36, No. 3, pp. 1120, 2008.

B. E. Boser, et al., "A training algorithm optimal margin classifiers," in Conference on Learning T_, pp. 144-152, 1992.

I. S. Dhillon, et al., "Kernel k-means: spectral clustering and normalized cuts," in International Conference on Knowledge Discovery and Data Mining, pp. 551-556, 2004.

T. Jaakkola, et al., Exploiting generative models in discriminative classifiers, in Neural and Information Procedure Systems, pp. 487-493, 1998.

J. Pillai, et al., "Sectored random projections for cancelable iris biometrics," in International Conference on Acoustics, Speech and Signal Processing, pp. 1838-1841, 2010.

L. Masek, et al., "Matlab source code for a biometric identification system based on iris patterns," The School of Computer Science and Software Engineering, The University of Western Australia, 2003.

Nguyen, et al., "Kernel Dictionary Learning," IEEE International Conference on Acoustics, Speech, and Signal Processing, Mar. 24, 2012.

L. Ma, et al., "Efficient iris recognition by characterizing key local variations," IEEE Transactions on Image Processing, vol. 13, No. 6, pp. 739-750, 2004.

\* cited by examiner

Algorithm to compute $\beta_t + 1$ at the $(t+1)^{th}$ iteration.

Input: Kernel matrix at the $t^{th}$ iteration $K^{(t)}$, constraint
selected after the $t^{th}$ iteration $(t_i, t_j) \in C$,
update parameters $\{\lambda_{ij}^{(t)}, \psi_{ij}^{(t)}, (i,j) \in C\}$,
distance thresholds $d_u$ and $d_l$, parameter $\gamma$.

Output: $\beta_t + 1, \{\lambda_{ij}^{(t+1)}, \psi_{ij}^{(t+1)}, (i,j) \in C\}$

Initialization:
  1. if $t = 0$ then
     $\lambda_{ij}^{(t)} = 0, \forall (i,j) \in C$.
     $\psi_{ij}^{(t)} = d_u$, if $yt_i = yt_j$, $\psi_{ij}^{(t)} = d_l$, otherwise.
  2. $\delta = 1$ if $yt_i = yt_j$, $\delta = -1$ otherwise.

Parameter Update:

$$p = K_{t_i t_i}^{(t)} + K_{t_j t_j}^{(t)} - 2K_{t_i t_j}^{(t)}$$

$$\alpha = \min(\lambda_{t_i t_j}^{(t)}, \frac{\delta}{2}(\frac{1}{p} - \frac{\gamma}{\psi_{t_i t_j}^{(t)}}))$$

$$\beta_t + 1 = \frac{\delta\alpha}{(1-\delta\alpha p)}$$

$$\lambda_{t_i t_j}^{(t+1)} = \lambda_{t_i t_j}^{(t)} - \alpha$$

$$\psi_{t_i t_j}^{(t+1)} = \frac{\gamma \psi_{t_i t_j}^{(t)}}{\gamma + \delta\alpha\psi_{t_i t_j}^{(t)}}$$

$$\lambda_{ij}^{(t+1)} = \lambda_{ij}^{(t)}, \forall (i,j) \in C, (i,j) \neq (t_i, t_j)$$
$$\psi_{ij}^{(t+1)} = \psi_{ij}^{(t)}, \forall (i,j) \in C, (i,j) \neq (t_i, t_j)$$

FIG. 7

SYSTEM AND METHOD FOR SENSOR ADAPTATION IN IRIS BIOMETRICS

STATEMENT REGARDING FEDERALLY SPONSORED RESEARCH AND DEVELOPMENT

The development of the invention described herein was funded by the U.S. Office of Naval and Aviation Search under Contract No. N000141210124 and Contract No. N00014-10-1-0934. The U.S. Government has certain rights in this invention.

REFERENCE TO THE RELATED APPLICATIONS

This Utility Patent Application is based on a Provisional Patent Application No. 61/780,462 filed on 13 Mar. 2013.

FIELD OF THE INVENTION

The present invention is directed to a non-contact biometric authentication, and more in particular, to an iris recognition system and method.

More in particular, the present invention is directed to an iris recognition technique capable of handling the sensor mismatch problem which occurs when the enrollment iris samples and test iris samples are acquired with different sensors.

In overall concept, the present system and method are directed to an iris recognition technique capable of adapting iris data collected from one sensor to another sensor by transforming the iris samples in a fashion permitting the bringing of samples belonging to the same class closer than those samples belonging to different classes, irrespective of the sensor acquiring the samples.

In addition, the present technique is directed to a system and method for iris recognition which are based on sensor adaptation techniques which use the iris samples acquired with different sensors for learning adaptation parameters and subsequently applying the adaptation parameters for sensor adaptation during testing (verification stage) to significantly improve the recognition system performance.

The present system and method are is also directed to iris recognition augmented with a machine learning algorithm for sensor adaptation which is based on a novel kernel learning framework for iris biometrics, and which solves the sensor adaptation as an optimization problem to develop an efficient and accurate authentication.

The present system and method are further directed to a sensor adaptation technique easily incorporable into existing iris recognition systems to handle the sensor mismatch problem with the goal of attaining a high accuracy in matching the enrollment iris data and the test iris data, and which is also capable of handling in-plane eye rotation, incorporating privacy by using cancelable iris patterns, and accommodating real-valued feature representations.

BACKGROUND OF THE INVENTION

Iris recognition is one of the most popular approaches for non-contact biometric authentication. As presented in K. W. Bowyer, et al., "Image understanding for iris biometrics: A survey," *Computer Vision and Image Understanding*, Vol. 110, No. 2, pp. 281-307, 2008, iris patterns are believed to be unique for each person, and remain stable for long periods of time, making them a natural choice as a biometric signature.

In J. R. Matey, et al., "Iris recognition—beyond one meter," in *Handbook of Remote Biometrics* (M. Tistarelli, S. Z. Li, and R. Challeppa, eds), Advances in Pattern Recognition, pp. 23-59, Springer London, 2009, there is shown that over the past decade, sensors for acquiring iris patterns have undergone significant transformations, where the existing sensors have been upgraded, and the new ones have been developed. These transformations pose new challenges to iris recognition algorithms. Due to the large number of users, the enrollment process (when enrollment iris samples are acquired, processed, and saved in a database to be retrieved for matching with the test iris samples in the verification process) is expensive and time-consuming. This dictates the re-enrollment of users each time a new sensor is developed.

In practice, situations are often encountered where iris images for enrollment and testing images for verification are acquired by different sensors.

Recent studies in iris biometrics evidence that cross sensor matching, where different sensors are employed for enrollment and testing, often lead to reduced performance. This is illustrated in the diagram presented in FIG. 1 using data obtained with LG2200 and LG4000 sensors. As may be observed, the Receiver Operating Characteristics (ROC) curve (a) of cross-sensor matching is inferior to that of same-sensor matching presented by curves "b" and "c", respectively. This performance degradation due to the difference in the sensors used at the enrollment process and the testing process is referred to as the "sensor mismatch" problem in iris recognition. Techniques designed to alleviate the sensor mismatch are referred to as "sensor adaptation" methods.

While the sensor mismatch problem has been empirically illustrated by K. Bowyer, et al., in "Factors that degrade the match distribution in iris biometrics," *Identify in the Information Society*, Vol. 2, No. 3, pp. 327-343, 2009 and R. Connaughton, et al., "A cross-sensor evaluation of three commercial iris cameras for iris biometrics," in *IEEE Computer Society Workshop on Biometrics,* pp. 90-97, 2011, it is believed that no algorithms have been developed as of yet for sensor adaptation specific to iris biometrics.

Due to the different design possibilities and the significant commercial interests in iris recognition, numerous iris acquisition systems are available.

Some of the popular systems are LG2200, LG4000, Iris on the Move portal system by Sarnoff, Combined Face And Iris Recognition System (CFAIRs) by Honeywell, HBOX™ system by Global Rainmakers Inc., and Eagle-Eyes™ system by Retica. The detailed review of the iris recognition systems is well presented in J. R. Matey, et al., "Iris recognition—beyond one meter," in *Handbook of Remote Biometrics* (M. Tistarelli, S. Z. Li, and R. Challeppa, eds), Advances in Pattern Recognition, pp. 23-59, Springer London, 2009.

As presented in FIG. 2, the main components of an existing iris recognition system 10, for example, the Daugman's iris recognition system, presented in J. Daugman, "High confidence visual recognition of persons by a test of statistical independence," *IEEE Transaction on Pattern Analysis and Machine Intelligence*, Vol. 15, No. 11, pp. 1148-1161, 1993, are represented by an image acquisition sub-systems 12 and 12', iris segmentation sub-systems 14 and 14', feature extraction sub-systems 16 and 16', and a template matching sub-system 18.

The iris image acquisition sub-system 12 is used in the iris recognition systems to acquire a sample of an iris image. The image acquisition sub-systems differ mainly in the type and location of the illumination they use, the type of sensor, and the presence of additional optical elements (J. R. Matey, et al., "Iris recognition—beyond one meter," in *Handbook of Remote Biometrics* (M. Tistarelli, S. Z. Li, and R. Challeppa, eds), Advances in Pattern Recognition, pp. 23-59, Springer London, 2009). To control the illumination conditions, most commercial systems reject the ambient light and use an active illumination source. Normally, illumination is chosen in the 720-900 nm wavelength, a range where the reflection properties of the melanin pigment on the human iris and the absorption properties of the image sensor used are favorable. Silicon is the popular choice for commercial image sensors, though materials like Germanium with longer wavelengths can also be used.

Most commercial systems use LED illumination since they are small, bright, and simple to control. Lasers, fluorescent lamps, and flash lights are other common active illumination sources. Optical elements, like lenses, are often used to collect and focus light on the image sensor and match the pixel sizes of the human iris and the image sensor.

Iris segmentation sub-systems 14 and 14' are included in the iris recognition system for finding the pixels in the respective iris image, including enrollment iris image and the test iris image. The iris segmentation involves finding the pupillary and limbic boundaries at the iris image and detecting the occlusion due to eyelids, eyelashes, and specularities. For example, in J. Daugman, "High confidence visual recognition of persons by a test of statistical independence," *IEEE Transaction on Pattern Analysis and Machine Intelligence*, Vol. 15, No. 11, pp. 1148-1161, 1993, the iris boundaries are approximated as circles and an integro-differential operator is used to find the optimal parameters of these circles. Masks are computed within the two circles to ignore pixels occluded by eyelids and eyelashes.

After the segmentation, the extracted iris region is mapped into a dimensionless coordinate system to normalize the size, and features are extracted in the feature extracting sub-systems 16 and 16' from the iris region. For example, the Daugman's system uses two-dimensional Gabor filters to capture the texture of the iris region and quantizes the phase response into a pair of bits. This leads to a binary representation of iris texture which is referred to herein as the iris code.

The normalized Hamming distance may be used in the matching sub-system 18 for matching the iris code 20 obtained from the test image with the iris code 22 of the enrollment iris image stored in the gallery, also referred to herein as a database 24 of the enrollment samples representations.

Iris code is the most popular representation for iris biometrics since its matching involves only binary operations, which are extremely efficient. Furthermore, the storage requirements are also significantly reduced by the binary representation of the codes.

In addition to the Gabor filters, numerous other filters are known which have also been used in the iris recognition systems to obtain binary representations from an iris image, including Gaussian filter, dyadic wavelet transform, Laplacian of Gaussian filter, Log-Gabor filters, and Discrete Cosine Transform (DCT), presented in Z. Sun, et al., "Robust Encoding of Local Ordinal measures: A general framework of Iris Recognition" in European Conference of Computer Vision Workshop, pp. 270-282, 2004; L. Ma, et al., "Efficient iris recognition by characterizing key local variations," *IEEE Transactions on Image Processing*, Vol. 13, No. 6, pp. 739-750, 2004; C. T. Chou, et al., "Iris recognition with multi-scale edge-type matching," in *International Conference on Pattern Recognition*, pp. 545, 548, 2006; P. Yao, et al., "Iris recognition algorithm using modified log-Gabor filters," in *International Conference on Pattern Recognition*, pp. 461-464, 2006; as well as D. M. Monro, et al., "Det-based iris recognition," *IEEE Transactions on Pattern Analysis and Machine Intelligence*, Vol. 29, No. 4, pp. 586-595, 2007.

Though less popular than the algorithms using binary representation, there exist numerous algorithms for iris recognition using real-valued features. These methods mainly use the output of the wavelet transform applied on the iris region as the feature and the Euclidean distance or Support Vector Machines for matching.

W. W. Boles, et al., in "A human identification technique using images of the iris and wavelet transform," *IEEE Transactions on Signal Processing*, Vol. 46, No. 4, pp. 1185-1188, 1998, applied wavelet transform on concentric circular bands of iris pixels and developed dissimilarity functions on the zero crossings of the transform output. J. Gan, et al., in "Applications of wavelet packets decomposition in iris recognition," in *International Conference on Biometrics*, pp. 443-449, 2006 used Daubechies-4 wavelet as feature and weighted Euclidean distance for matching statistical techniques including Principal component analysis, Independent Component Analysis, and Linear Discriminant Analysis have also been used to obtain real-valued feature vectors.

Owing to the large number of iris recognition systems currently available and the continuous improvement of existing systems, the inter-operability of iris recognition systems has become extremely important. Several papers have addressed the problem of biometric interoperability for fingerprint sensors, including A. Ross, et al., "Biometric sensor interoperability: A case study in fingerprints," in *International ECCV Workshop on Biometric Authentication*, pp. 134-145, 2004; F. Alonso-Fernandez, et al., "Sensor interoperability and fusion in fingerprint verification: A case study using minutiae-and ridge-based matchers," in *International Conference on Control, Automation, Robotics and Vision*, pp. 1-6, 2006; and for multi-biometrics systems (F. Alonso-Fernandez, et al., "Quality-based conditional processing in multi-biometrics: Application to sensor interoperability," *IEEE Transactions on Systems, Man and Cybernetics*, Vol. 40, No. 6, pp. 1168-1179, 2010).

For face verification, the influence of camera types was identified in P. Phillips, et al., "An introduction evaluating biometric system," *Computer*, Vol. 33, pp. 56-63, Feb. 2000. E. Gonzales, et al., "Looking for hand biometrics interoperability," in *Hand-Based Biometrics (ICHB)*, 2011 *International Conference on*, pp. 1-6, 2011, developed methods for inter-operability among hand biometric systems.

In iris biometrics, this problem was first investigated by Bowyer et al, in "Factors that degrade the match distribution in iris biometrics," *Identity in the Information Society*, Vol. 2, pp. 327-343, 2009, using two iris sensors. Their work demonstrated that the older of the two sensors provided less desirable match score distributions. Furthermore, the cross-sensor performance was inferior to that of either sensors tested individually, as may be observed in FIG. 1.

Cross-sensor iris recognition was further explored by R. Connaughton et al., in "A cross-sensor evaluation of three commercial iris cameras for iris biometrics," in *IEEE Computer Society Workshop on Biometrics*, pp. 90-97, 2011, and R. Connaughton, et al., "A multialgorithm analysis of three iris biometric sensors," *IEEE Transactions on Information Forensics and Security*, Vol. 7, No. 3, pp. 919-931, 2012, who experimented with three commercially available iris sensors. However, while these methods clearly demonstrate the need for improving the cross-sensor recognition performance, no algorithms have been proposed for handling the sensor mismatch problems.

It is, therefore, would be highly desirable to provide a technique which may be incorporated in the existing iris recognition systems capable of producing comprehensive solution for the sensor mismatch problem to efficiently mitigate the cross sensor performance degradation by adapting the iris samples from one sensor to another.

T. Hofmann, et al., in "Kernel methods in machine learning," *Annals of Statistics*, Vol. 36, No. 3, pp. 1120, 2008, presents an extensive description of the topic. The use of kernel methods in the machine learning is motivated by the fact that traditionally, the theory and algorithms for machine learning are well developed, well understood and efficient for linear models. However, non-linear models are often required to describe the data. Instead of explicitly learning a non-linear model, kernel methods project the data into a higher dimensional space and learn linear models in the projected space. By the special construction of these methods, data appear in computation only in the form of inner products, which can be performed without explicit projection into the high dimensional space, using kernel functions.

Kernels incorporate the prior knowledge available about a problem and hence the choice of kernel is very crucial. Existence of a good kernel for a task automatically makes a wide variety of kernel algorithms applicable for that task.

B. E. Boser, et al., "A training algorithm optimal margin classifiers," in *Conference on Learning Theory*, pp. 144-152, 1992, introduced kernels into mainstream machine learning literature by combining kernel functions and maximum margin hyperplanes, leading to the well-known Support Vector Machines (SVM). Kernels have also been used for clustering as presented in I. S. Dhillon, et al., "Kernel k-means: spectral clustering and normalized cuts," in *International Conference on Knowledge Discovery and Data Mining*, pp. 551-556, 2004; for metric learning, as presented in J. V. Davis, et al., "Information-theoretic metric learning," in *International Conference on Machine Learning*, pp. 209-216, 2007; for domain adaptation, as presented in K. Saenko, et al., "Adapting visual category models to new domains," in *European Conference on Computer Vision*, pp. 213-226, 2010; for probabilistic regression, as presented in T. Jaakkola, et al., Exploiting generative models in discriminative classifiers," in *Neural and Information Processing Systems*, pp. 487-493, 1998; and for dictionary learning, as presented in Kernel Dictionary Learning, 2012.

These advantages of kernel methods have led to the development of specialized kernel functions for applications like text categorization, as presented in H. Lodhi, et al., "Text classification using string kernels," *Journal of Machine Learning Research*, Vol. 2, pp. 419-444, 2002. Furthermore, algorithms have also been developed for learning kernel functions having desired properties, as presented in K. Q. Weinberger, et al., "Learning a kernel matrix for nonlinear dimensionality reduction," in *Proceedings of the twenty-first international conference on Machine learning*, ICML '04, (New York, N.Y., USA), pp. 106 and further, ACM, 2004.

It is, therefore, would be desirable to use kernel based approach for producing comprehensive solution for the sensor mismatch problems.

SUMMARY OF THE INVENTION

It is an object of the present invention to provide a comprehensive solution to the problem of cross-sensor matching occurring in iris recognition systems where the test samples are verified using data enrolled with a different sensor.

It is another object of the present invention to incorporate a machine learning technique and a routine for adaptation of the iris samples from one sensor to another into existing iris recognition systems to efficiently mitigate the cross-sensor performance degradation.

It is a further object of the present invention to provide a novel optimization framework for learning transformations in iris biometrics, and to utilize the optimization framework for sensor adaptation through reduction, in the transformation space, the distance between samples of the same class (i.e., iris features belonging to the same human), and increasing the distance between samples of different classes (i.e., iris features belonging to different humans), irrespective of the sensors acquiring them.

It is still an object of the present invention to provide an optimization framework for learning transformations in iris biometrics where the transformations may be concisely represented using kernel functions, and where the novel framework is utilized for sensor adaptation by constraining the samples from different sensors to behave in a similar manner in the transformed domain in order to ensure that the sensor mismatch problem is alleviated, when cross-sensor matching is performed in the transformed domain.

It is also an object of the present invention to provide a machine learning framework capable of handling the in-plane rotations of eyes, cancelable patterns and no-binary feature representations.

It is another object of the present invention to provide a sensor adaptation technique requiring limited changes to the existing iris recognition pipeline which can easily be incorporated into existing iris recognition systems.

It is an additional object of the present invention to provide an efficient solution for an optimization problem in cross-sensor matching environment which is obtained using Bregman projections and which involves the routine of estimating the adaptation parameters during the training stage, and transformation of the test iris samples during the testing stage using these adaptation parameters.

It is a further object of the present invention to provide a sensor adaptation in iris recognition through establishing the novel kernel learning framework for iris biometrics for developing transformations of iris codes having desired properties which can be utilized for performing numerous tasks in iris biometrics, such as max-margin classification, dimensionality reduction, and metric learning.

In one aspect, the present invention is a method for iris recognition which is carried out in three subsequent stages, including an adaptation parameters learning (or training) stage followed by a testing (or verification) stage, and the matching stage following the testing.

In the training stage of operation, a plurality of training iris samples $\mathcal{L} = \{\theta_1, \theta_2, \ldots, \theta_N\}$ are acquired with a plurality of different sensors $\{S_1, S_2, \ldots, S_{Ns}\}$ for a plurality of subjects $\{y_1, y_2, \ldots y_{Nc}\}$. Subsequently, for each pair $\theta_i, \theta_j$ of training iris samples from the plurality $\mathcal{L}$ thereof, a data processing sub-system of the iris recognition system computes a similarity measure $\mathcal{F}(\theta_i, \theta_j)$ between the training iris samples $\theta_i$ and $\theta_j$, where $\theta_i, \theta_j \in \mathcal{L}$.

An initial training kernel matrix $K^0 = \mathcal{F}(\theta_i, \theta_j)$ is formed for the plurality of training iris samples, and subsequently the initial training kernel matrix $K^0$ is iteratively updated by applying Bregman projections at each iteration, thereby forming a final training kernel matrix $K^A(\theta_i,\theta_j)$, and thereby establishing a space of allowable transformations for the plurality of training iris samples $\theta_i,\theta_j$ satisfying predetermined constraints $C\{\theta_i,\theta_j\}$ imposed between the training iris samples $\theta_i$ and $\theta_j$. Subsequently, the final and initial kernel matrices are processed to extract adaptation parameters $\sigma_{ij}$, and the method proceeds to performing the testing stage of operation subsequently to the training stage.

The testing stage of operation is initiated with the step of acquiring a test iris sample $\theta_t$, and proceeds to compute the similarity measure $\mathcal{F}(\theta_t,\theta)$ for the test iris sample $\theta_t$ and the plurality of the training iris samples $\theta \in \mathcal{L}$. Upon completion of the similarity measure calculation, an initial test matrix $K^0_{test} = \mathcal{F}(\theta_t,\theta)$ is computed, followed by the computation of a test adapted kernel function $K^A_{test}$ for the testing iris sample $\theta_t$ based on the initial test matrix $K^0_{test}$ and the adaptation parameters $\sigma_{ij}$ computed in the training stage as $$^A K(\theta_t, \theta) = \mathcal{F}(\theta_t, \theta) + \sum_{ij} \sigma_{ij} \mathcal{F}(\theta_t, \theta_i) \mathcal{F}(\theta_j, \theta).$$

A matching routine is performed subsequently to the testing stage of operation through the steps of:

computing a distance measure, preferably, squared Euclidean distance, between the test iris sample $\theta_t$ and an enrollment iris sample $\theta_{en}$, and verifying the test iris sample as genuine if the distance measure in the transformed space between the test and enrollment iris samples is smaller than a predetermined threshold.

The similarity measure $\mathcal{F}(\theta_i, \theta_j)$ between the training samples $\theta_i$ and $\theta_j$ is computed by $$\mathcal{F}(\theta_i, \theta_j) = \frac{\eta_A(\theta_i, \theta_j) - \eta_D(\theta_i, \theta_j)}{4\eta(\theta_i, \theta_j)},$$

wherein $\eta_A(\theta_i,\theta_j)$ is the number of valid bits in said training samples $\theta_i$ and $\theta_j$ that agree, $\eta_D(\theta_i,\theta_j)$ is the number of valid bits in said training samples $\theta_i$ and $\theta_j$ that disagree, and $\eta(\theta_i,\theta_j)$ is the number of valid bits in said $\theta_i$ and $\theta_j$ cumulatively.

The constraints $C\{\theta_i,\theta_j\}$ applied to the transforms include at least one constraint selected from a group including distance preserving constraints, and application-specific constraints which include inter-sensor constraints and intra-sensor constraints. In accordance with the distance-preserving constraints, distances between each pair of the training iris samples of the plurality are preserved by the learned transformations. The application-specific constraints $C(\phi) \leq 0$ are to be satisfied by the learned transformation, wherein said $C(\phi)$ depends on the constraints being imposed. In accordance with the inter-sensor constraints, $\zeta_e(\phi(\theta_i),\phi(\theta_j)) \leq d_u$, if $y_i=y_j$, $s_i \neq s_j$ $\zeta_e(\phi(\theta_i),\phi(\theta_j)) \geq d_l$, if $y_i \neq y_j$, $s_i \neq s_j$;

wherein $d_u$ is the upper distance threshold, and $d_l$ is the lowest distance threshold, $\zeta_e(\cdot,\cdot)$ is the squared Euclidean distance, and $\phi(\theta_i)$, $\phi(\theta_j)$ denote transformations applied to $\theta_i$ and $\theta_j$, respectively. In accordance with the intra-sensor constraints, $\zeta_e(\phi(\theta_i),\phi(\theta_j)) \leq d_u$, if $y_i=y_j$, $s_i=s_j$ $\zeta_e(\phi(\theta_i),\phi(\theta_j)) \geq d_l$, if $y_i \neq y_j$, $s_i=s_j$.

While updating the initial kernel matrix into the final kernel matrix, at each iteration $(t+1)^{th}$, the Bregman projections constitute the Bregman update computed as $$K^{t+1} = K^t + \beta_{t+1} K^t e_{t_i} e_{t_j}^T K^t$$

where $K^0 = \mathcal{F}$, $e_{t_j}^T$ is the transpose of the vector $e_{t_j}$, and scalar $\beta_{t+1}$ is computed at each iteration until convergence of said $K^0$ during adaptation.

Furthermore, the final training kernel matrix $K^A$ is computed as $$K^A = K^0 + \sum_{(i,j) \in C} \sigma_{ij} K^0 e_i e_j^T K^0$$

wherein the adaption parameter $\sigma_{ij}$ represent the contribution made by the $(i,j)^{th}$ constraint to the final kernel matrix $K^A$.

The final training kernel matrix $K^A$ is a solution of an optimization problem $$K^A = \arg\min_{K \in \mathcal{S}} \sum_{\theta_i, \theta_j \in \mathcal{L}} \zeta_d(K_{ii} + K_{jj} - 2K_{ij}, \mathcal{H}(\theta_i, \theta_j))$$

subject to the constraints, $\theta_i, \theta_j \in \mathcal{L}$, $K_{ii} + K_{jj} - 2K_{ij} \geq d_u$, if $y_i=y_j$ $K_{ii} + K_{jj} - 2K_{ij} \leq d_l$, if $y_i \neq y_j$ wherein $K^A(\theta_i,\theta_j) = \phi^A(\theta_i)^T \phi^A(\theta_j)$ is the adapted kernel matrix corresponding to the optimal transformation, S is the space of all position semi-definite matrices, and each $K_{ii}$, $K_{ij}$, $K_{jj}$ denotes the kernel matrix whose respective $(i,i)^{th}$, $(i,j)^{th}$, or $(j,j)^{th}$ entry is the kernel function between corresponding samples, wherein $K_{ii}=K(\theta_i,\theta_i)$, $K_{ij}=K(\theta_i,\theta_j)$, $K_{jj}=K(\theta_j,\theta_j)$.

In the testing stage of operation, the similarity measure $\mathcal{F}(\theta_t,\theta)$ between the test iris sample and each the training iris sample $\theta$ from the plurality $\mathcal{L}$ thereof is computed as:

$$\frac{\eta_A(\theta_t, \theta) - \eta_D(\theta_t, \theta)}{4\eta(\theta_t, \theta)},$$

wherein $\eta_A(\theta_t,\theta)$ is the number of valid bits in the test iris sample $\theta_t$ and the training iris samples $\theta$ that agree, $\eta_D(\theta_t,\theta)$ is the number of valid bits in the test iris sample $\theta_t$ and training samples $\theta$ that disagree, and $\eta(\theta_t,\theta)$ is the number of valid bits in the $\theta_t$ and $\theta$ cumulatively.

The algorithm underlying the subject method is augmented by features which further improve the iris recognition. Specifically, the in-plane rotation of the test or enrollment iris samples is contemplated which is performed through the steps of:

rotating one of the test and enrollment iris samples by a plurality of possible values $\mathcal{R}$, comprising a normalized Hamming distance $\mathcal{H}(\theta_t,\theta_{en})$ for each of the rotations, and computing an effective matching distance between $\theta_t$ and $\theta_{en}$ as the minimum of said $\mathcal{H}$, $\mathcal{H}_r(\theta_t,\theta_{en}) = \min_{r \in \mathcal{R}} \mathcal{H}(\theta_t, r(\theta_{en}))$, where r(·) represents rotation of iris sample by a fixed angle, and wherein the similarity measure is derived as $$\mathcal{F}_r(\theta_t,\theta_{en})=\max{}_{r\in\mathbf{R}}\mathcal{F}(\theta_t,r(\theta_{en})).$$

Further, the privacy feature is incorporated through cancelable iris codes in the iris samples representations through the steps of:

dividing each of the training iris samples θ and the test iris sample $\theta_t$ into a number of sectors, extracting Gabor vector features from each of the sectors, applying Random Projections to the feature vectors of each sector, concatenating the Random Projections of the feature vectors, thereby forming a transformed feature vector of each iris sample, extracting cancelable iris code from the transformed feature vector, storing the cancelable iris code for the enrollment iris sample in an enrollment database, and using matching the cancelable iris code of the enrollment iris sample with the cancellable iris code of the test iris sample in the matching stage of operation.

In another aspect, the present invention constitutes a system for iris recognition which includes:

a data processing sub-system;

an enrollment sub-system operatively coupled to the data processing sub-system, wherein the enrollment sub-system includes at least a first iris sample acquisition sub-system including at least a first sensor acquiring a plurality of enrollment iris samples for a plurality of subjects, and a database storing representations of the enrollment iris samples.

A verification sub-system is operatively coupled to the data processing sub-system. The verification sub-system includes at least a second iris sample acquisition sub-system including at least a second sensor acquiring at least one test iris sample for matching with a respective enrollment iris sample from the database.

A sensor adaptation sub-system is operatively coupled to the data processing sub-system and operatively interconnected between the enrollment and verification sub-systems. The sensor adaptation sub-system includes:

a learning adaptation parameters sub-system receiving a plurality of training iris samples $\mathcal{L}=\{\theta_1, \theta_2, \ldots, \theta_N\}$ acquired by at least first and second sensors $\{S_1, S_2, \ldots, S_{Ns}\}$ for a plurality of subjects $\{y_1, y_2, \ldots y_{Nc}\}$, and configured for computing adaptation parameters $\sigma_{ij}$ for each pair of training iris samples $\theta_i,\theta_j$ from the plurality $\mathcal{L}$ thereof.

A similarity measure computation sub-system is operatively coupled to the second sensor of the verification sub-system to receive therefrom a representation of the test iris sample. The similarity measure computation sub-system also receives the plurality of training iris samples, and is configured for generating a similarity measure between the test iris sample and the plurality of training iris samples.

A sensor adaptation sub-system is operatively coupled to the similarity measure computation sub-system to receive the similarity measure therefrom and to the learning adaptation parameters sub-system to receive the adaptation parameters therefrom. The sensor adaptation sub-system is configured for computing an adapted kernel matrix $\mathcal{K}^A(\theta_t, \theta)$ for the test iris sample $\theta_t$ and the plurality $\mathcal{L}$ of training iris samples based on the similarity measure and the adaptation parameters.

A matching sub-system is coupled to the sensor adaptation sub-system to receive therefrom the adapted kernel matrix $\mathcal{K}^A(\theta_t,\theta)$ and to the database of the enrollment sub-system to receive therefrom a representation of the respective enrollment iris sample. The matching sub-system is configured for the computation of a distance measure, for example, the squared Euclidean distance, between the test and enrollment iris samples in a transformation space.

The matching sub-system is also configured to produce a verification for the test iris sample if the distance measure calculated between the test iris sample and the respective enrollment iris sample in the transformation space does not exceed a predetermined threshold.

The learning adaptation parameters sub-system is configured to compute a similarity measure $\mathcal{F}(\theta_i,\theta_j)$ for each pair of training iris samples $\theta_i,\theta_j$, to form an initial training kernel matrix $\mathcal{K}^0=\mathcal{F}(\theta_i,\theta_j)$ for the plurality of training iris samples, and iteratively updating the initial training kernel matrix $\mathcal{K}^0$ by applying Bregman projections at each iteration, thereby forming a final training kernel matrix $\mathcal{K}^A(\theta_i,\theta_j)$, and thereby establishing a space of allowable transformations for the training iris samples $\theta_i,\theta_j$ satisfying a predetermined constraint $\mathcal{C}\{\theta_i,\theta_j\}$ imposed between the training iris samples $\theta_i$ and $\theta_j$.

The data processing sub-system, particularly, the learning adaptation parameters sub-system thereof, computes adaptation parameters $\sigma_{ij}$ based on the initial and final training kernel matrices.

The similarity measure $\mathcal{F}(\theta_i,\theta_j)$ between the training samples $\theta_i$ and $\theta_j$ is computed as $$\mathcal{F}(\theta_i, \theta_j) = \frac{\eta_A(\theta_i, \theta_j) - \eta_D(\theta_i, \theta_j)}{4\eta(\theta_i, \theta_j)},$$

wherein $\eta_A(\theta_i,\theta_j)$ is the number of valid bits in the training samples $\theta_i$ and $\theta_j$ that agree, $\eta_D(\theta_i,\theta_j)$ is the number of valid bits in the training samples $\theta_i$ and $\theta_j$ that disagree, and $\eta(\theta_i,\theta_j)$ is the number of valid bits in the $\theta_i$ and $\theta_j$ cumulatively, The similarity measure $\mathcal{F}(\theta_t,\theta)$ for the test iris sample $\theta_t$ and the plurality of the training iris samples $\theta\in\mathcal{L}$, is computed as:

$$\frac{\eta_A(\theta_t, \theta) - \eta_D(\theta_t, \theta)}{4\eta(\theta_t, \theta)},$$

wherein $\eta_A(\theta_t,\theta)$ is the number of valid bits in the training samples $\theta_t$ and $\theta$ that agree, $\eta_D(\theta_t,\theta)$ is the number of valid bits in the training samples $\theta_t$ and $\theta$ that disagree, and $\eta(\theta_t,\theta)$ is the number of valid bits in the $\theta_t$ and $\theta$ cumulatively.

The sensor adaptation sub-system is further configured to apply the learned transforms, wherein the constraints $\mathcal{C}\{\theta_i,\theta_j\}$ constitute at least one constraint selected from a group including distance preserving constraints, application-specific constraints, inter-sensor constraints, and intra-sensor constraints.

In accordance with the distance-preserving constraints, distances between each pair of the training iris samples of said plurality thereof are preserved by the learned transformations; the application-specific constraints $\mathcal{C}(\phi)\leq 0$ are to be satisfied by said learned transformation, wherein each application specific constraint depends on the constrains being imposed.

In accordance with the inter-sensor constraints, $$\zeta_e(\phi(\theta_i),\phi(\theta_j)) \leq d_u, \text{ if } y_i = y_j, s_i \neq s_j$$

$$\zeta_e(\phi(\theta_i),\phi(\theta_j)) \geq d_l, \text{ if } y_i \neq y_j, s_i \neq s_j;$$

where $d_u$ is the upper distance threshold and $d_l$ is the lowest distance threshold; $\zeta_e(\cdot,\cdot)$ is the squared Euclidean distance, and $\phi(\theta_i)$, $\phi(\theta_j)$ denote transformations applied to $\theta_i$ and $\theta_j$, respectively; and in accordance with the intra-sensor constraints, $$\zeta_e(\phi(\theta_i),\phi(\theta_j)) \leq d_u, \text{ if } y_i = y_j, s_i = s_j$$

$$\zeta_e(\phi(\theta_i),\phi(\theta_j)) \geq d_l, \text{ if } y_i \neq y_j, s_i = s_j.$$

The learning adaptation parameters sub-system is further configured to compute the Bregman projections at each iteration $(t+1)^{th}$ by the data processing sub-system as $$\mathcal{K}^{t+1} = \mathcal{K}^t + \beta_{t+1} \mathcal{K}^t e_{t_i} e_{t_j}^T \mathcal{K}^t$$

where $\mathcal{K}^0 = \mathcal{F}$, $e_{t_i}^T$ is the transpose of the vector $e_{t_i}$, and scalar $\beta_{t+1}$ is computed at each iteration until convergence of the $\mathcal{K}^0$ during the kernel matrix adaptation, The final training kernel matrix $\mathcal{K}^A$ is computed as $$K^A = K^0 + \sum_{(i,j) \in C} \sigma_{ij} K^0 e_i e_j^T K^0$$

where the adaptation parameters $\sigma_{ij}$ represent the contributions made by the $(i,j)^{th}$ constraint to the final kernel matrix $\mathcal{K}^A$.

The learning adaptation parameters sub-system is further configured to solve the final training kernel matrix as an optimization problem $$K^A = \arg\min_{\mathcal{K} \in \mathcal{S}} \sum_{\theta_i, \theta_j \in \mathcal{L}} \zeta_d(K_{ii} + K_{jj} - 2K_{ij}, \mathcal{H}(\theta_i, \theta_j))$$

subject to the constraints, $\theta_i, \theta_j \in \mathcal{L}$, $$\mathcal{K}_{ii} + \mathcal{K}_{jj} - 2\mathcal{K}_{ij} \geq d_u, \text{ if } y_i = y_j$$

$$\mathcal{K}_{ii} + \mathcal{K}_{jj} - 2\mathcal{K}_{ij} \leq d_l, \text{ if } y_i \neq y_j$$

where the $\mathcal{K}^A(\theta_i,\theta_j) = \phi^A(\theta_i)^T \phi^A(\theta_j)$ is the adapted kernel matrix corresponding to the optional transformation, and S is the space of all position semi-definite matrices, and each $\mathcal{K}_{ii}, \mathcal{K}_{ij}, \mathcal{K}_{jj}$ denotes the kernel matrix whose respective $(i,i)^{th}$, $(i,j)^{th}$, or $(j,j)^{th}$ entry is the kernel function between corresponding samples, and wherein $\mathcal{K}_{ii} = \mathcal{K}(\theta_i,\theta_i)$, $\mathcal{K}_{ij} = \mathcal{K}(\theta_i,\theta_j)$, $\mathcal{K}_{jj} = \mathcal{K}(\theta_j,\theta_j)$.

The matching sub-system is further configured to perform rotation of the test or enrollment iris samples, thus further improving the iris recognition performance.

A cancelable iris code sub-system is operatively coupled to the enrollment and verification sub-system, and is configured to divide each of the training iris samples $\theta$ and the test iris samples $\theta_t$, and enrollment iris samples into a number of sectors, to extract Gabor vector features from each of the sectors,
to apply Random Projections to the feature vectors of each sector,
to concatenate said Random Projections of the feature vectors, thereby forming a transformed feature vector of each iris sample,
to extract cancelable iris code from the transformed feature vector,
to store the cancelable iris code for said enrollment iris sample in an enrollment database, and
to match the cancelable iris code of the enrollment iris sample with the cancellable iris code of the test iris sample.

The features and advantages of the present invention will become apparent taken in view of the patent drawings and detailed description of the preferred embodiment.

BRIEF DESCRIPTION OF THE DRAWINGS

FIG. 7 is a flow chart diagram representative of the algorithm for computation of Bregman projections in formulation of the efficient solution in sensor adaptation;

DETAILED DESCRIPTION OF THE PREFERRED EMBODIMENTS OF THE PRESENT INVENTION

The present concept is believed to find usefulness in many areas of non-contact biometric authentication, including, but not limited to, finger-based authentication and face-based authentication. However, as an example of possible applications of the subject system and method, the present invention will be further described for iris recognition.

Figure 1:
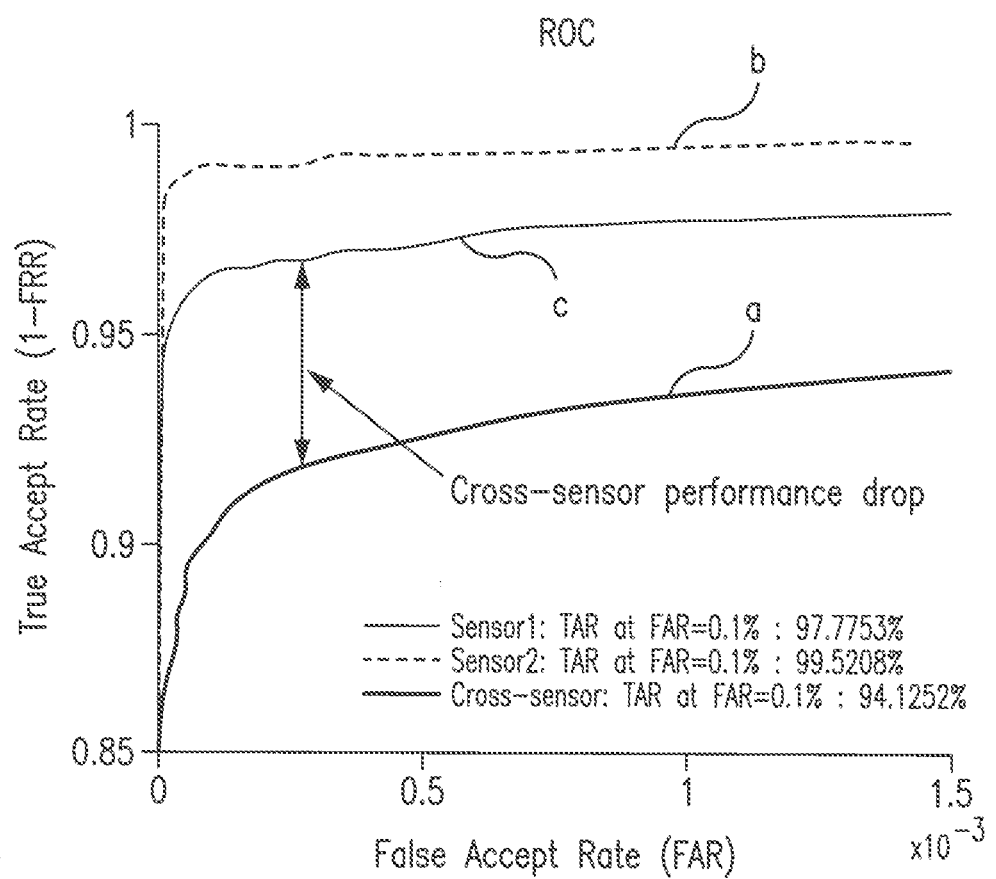
FIG. 1 is a diagram representing Receiver Operating Characteristics (ROC) in the cross-sensor environment as well as in the same sensor environment, indicating the degradation in verification accuracy due to the sensor mismatch.
Figure 2:
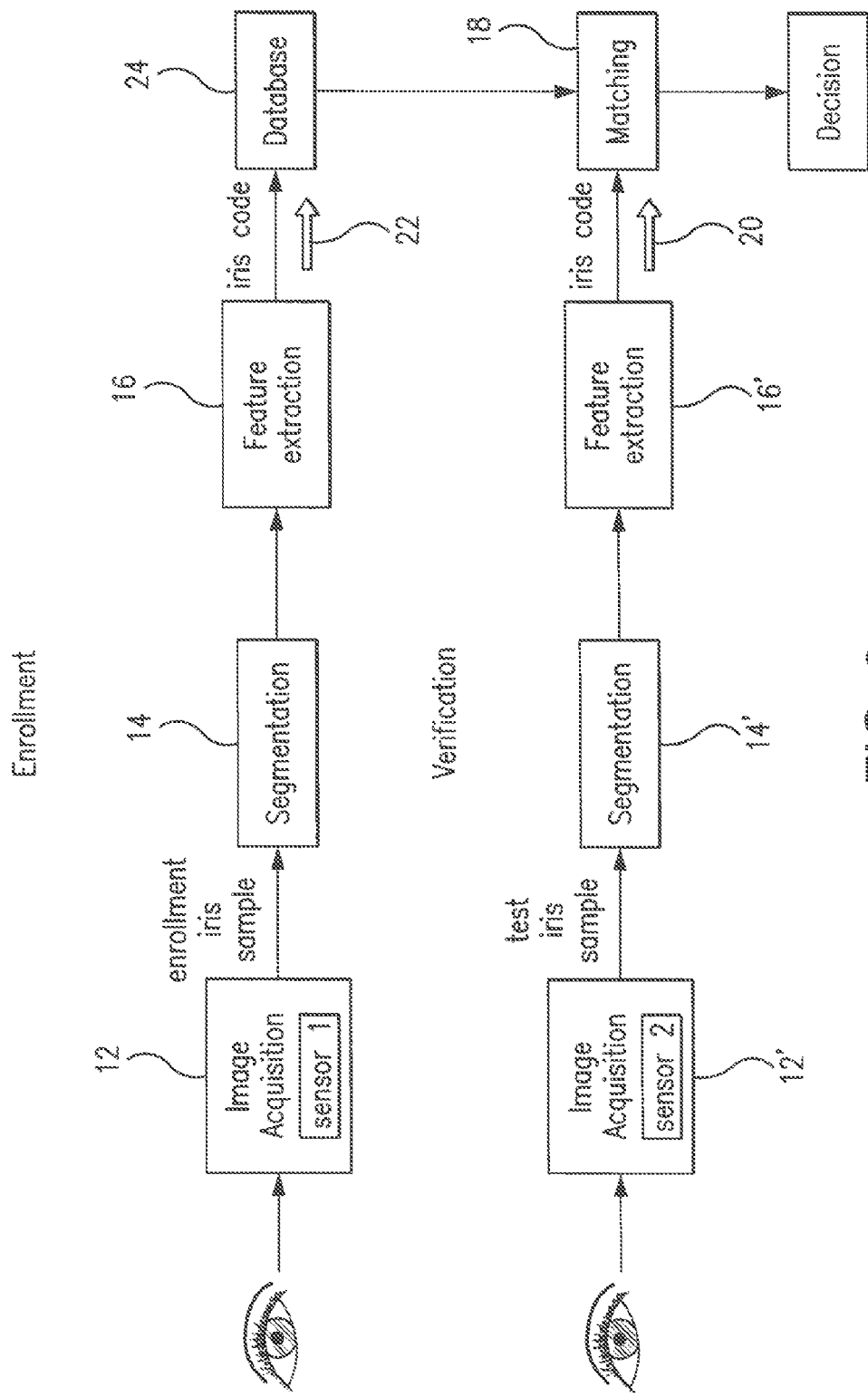
FIG. 2 is a schematic representation of the iris recognition system of the prior art.
Figure 3:
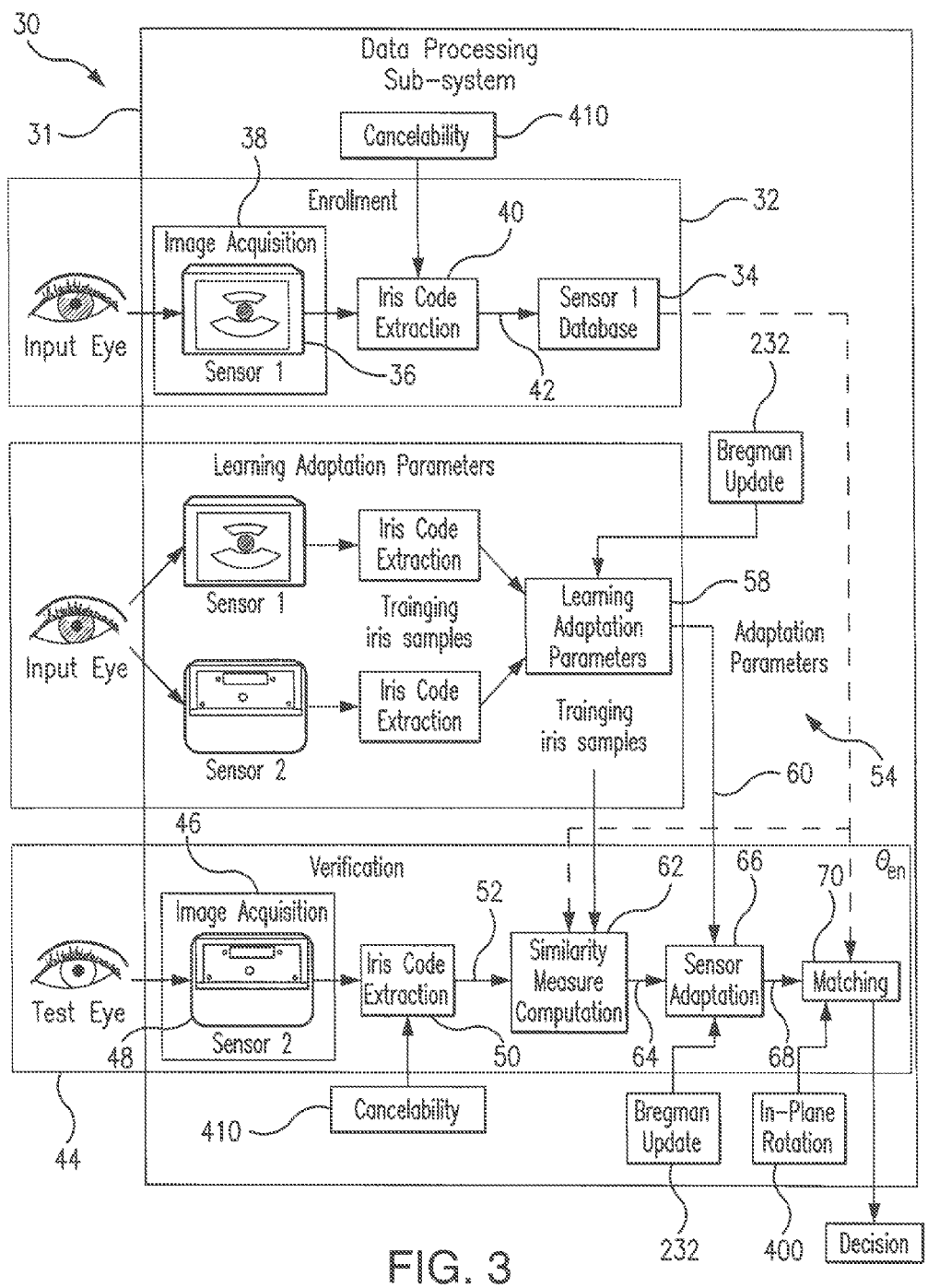
FIG. 3 is a iris recognition system of the present invention incorporating the sensor adaptation sub-system for iris biometrics.

As presented in FIG. 3, an iris recognition system 30 incorporates the subject sensor adaptation technique designed for adapting the iris samples between different sensors. The sensor adaptation technique is incorporated into existing iris recognition systems, requires minimal changes to the iris recognition pipeline, and attains considerable improvement in cross-sensor iris recognition accuracy.

The subject iris recognition system 30 operates through computations performed by a data processing system 31 configured in accordance with the subject algorithm detailed in further paragraphs in conjunction with FIGS. 3-7.

As shown, the iris recognition system 30 includes an enrollment sub-system 32 operating for acquiring enrollment iris samples, processing the acquired enrollment samples, and saving representations of the enrollment samples in a database 34 for being further used in a matching routine as will be detailed in further paragraphs. The enrollment sub-system 32 operates with a sensor 36 as a part of an image acquisition sub-system 38, and an iris code extraction sub-system 40 which processes the images received from the image acquisition sub-system 38 to produce the binary representation, also known as iris codes, of the enrollment sample (image). The iris codes 42 of a number of the enrollment subjects (humans) are stored in the database 34.

A verification sub-system 44 includes an image acquisition sub-system 46 operating with a sensor 48 for acquiring test iris samples needed in the process of authentication. The test iris sample is processed in an iris code extraction sub-system 50 to produce a binary representation of the test sample, also referred to herein as a test iris code 52.

The subject sensor adaptation sub-system 54 is embedded in the iris recognition system 30 to handle the sensor mismatch problem when sensor 36 and sensor 48 differ one from another. The sensor adaptation sub-system 54 is based on the subject machine learning technique to handle sensor shift in iris biometrics. It provides a general optimization framework for learning transformations of iris biometrics, where the transformations can be concisely represented using kernel functions.

The optimization framework is utilized in the sensor adaptation sub-system 54 for sensor adaptation by constraining the samples acquired by different sensors 36 and 48 to behave in a similar manner in the transformed domain (space).

Specifically, in the transformed space the following constraints may be enforced on the transformation: (a) the distances between iris samples belonging to the same class (i.e., belonging to the same person) should be small, irrespective of the sensor used for the iris samples acquisition, and (b) the distances between samples of different classes (of different persons) should be large. These constraints ensure that the sensor mismatch problem is alleviated, when cross-sensor matching is performing in the transformed domain by the sensor adaptation sub-system 54.

Furthermore, the sensor adaptation sub-system 54 is designed with the ability of sensor adaptation posed as an optimization problem for developing an efficient solution with a high degree of accuracy. An efficient solution can be obtained in the sensor adaptation sub-system 54 using Bregman projections, as will be detailed further herein, to avoid solving the optimization problem every time a test sample is acquired. The efficient solution involves estimating adaptation parameters during the training stage within the kernel function learning technique.

During the testing stage of the system operation, the test eye samples are transformed using the learned adaptation parameters. Cross-sensor matching is then performed using the transformed iris samples. Since the learned transformation alleviates the sensor mismatch problem, cross-sensor matching in the transformed domain improves the matching accuracy.

The inclusion of the sensor adaptation sub-system 54 in the iris recognition system 30 can be also utilized for performing a wide variety of operations in iris biometrics including max-margin quantification, dimensionality reduction, and metric learning, can handle rotation of eyes, accommodate cancelable patterns for privacy and real-valued feature representations, as will be detailed further herein.

Figure 4:
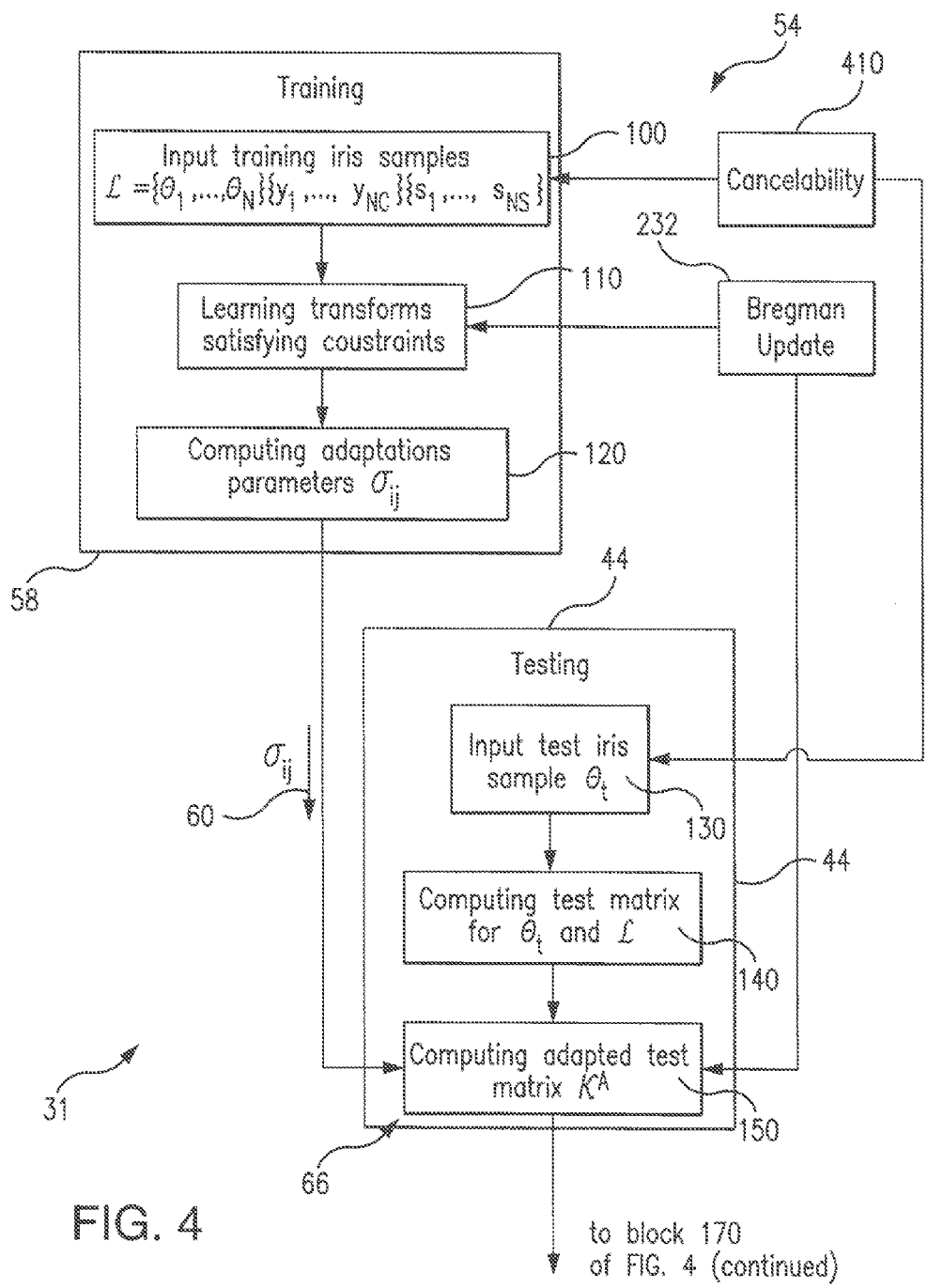
FIG. 4 is a block diagram representing the flow chart of the process underlying the operation of the system presented in FIG. 3.
Figure 4:
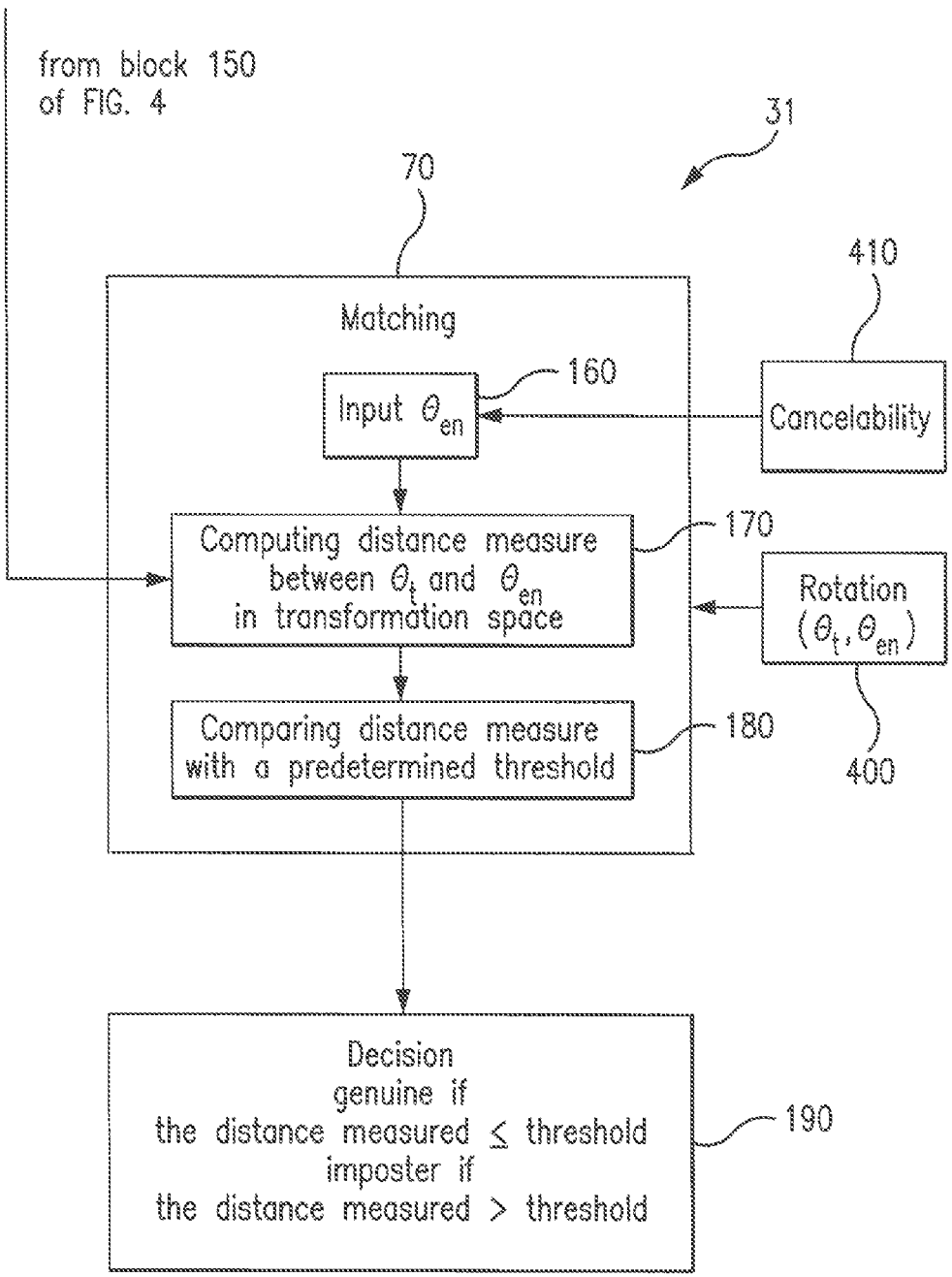
Figure 5:
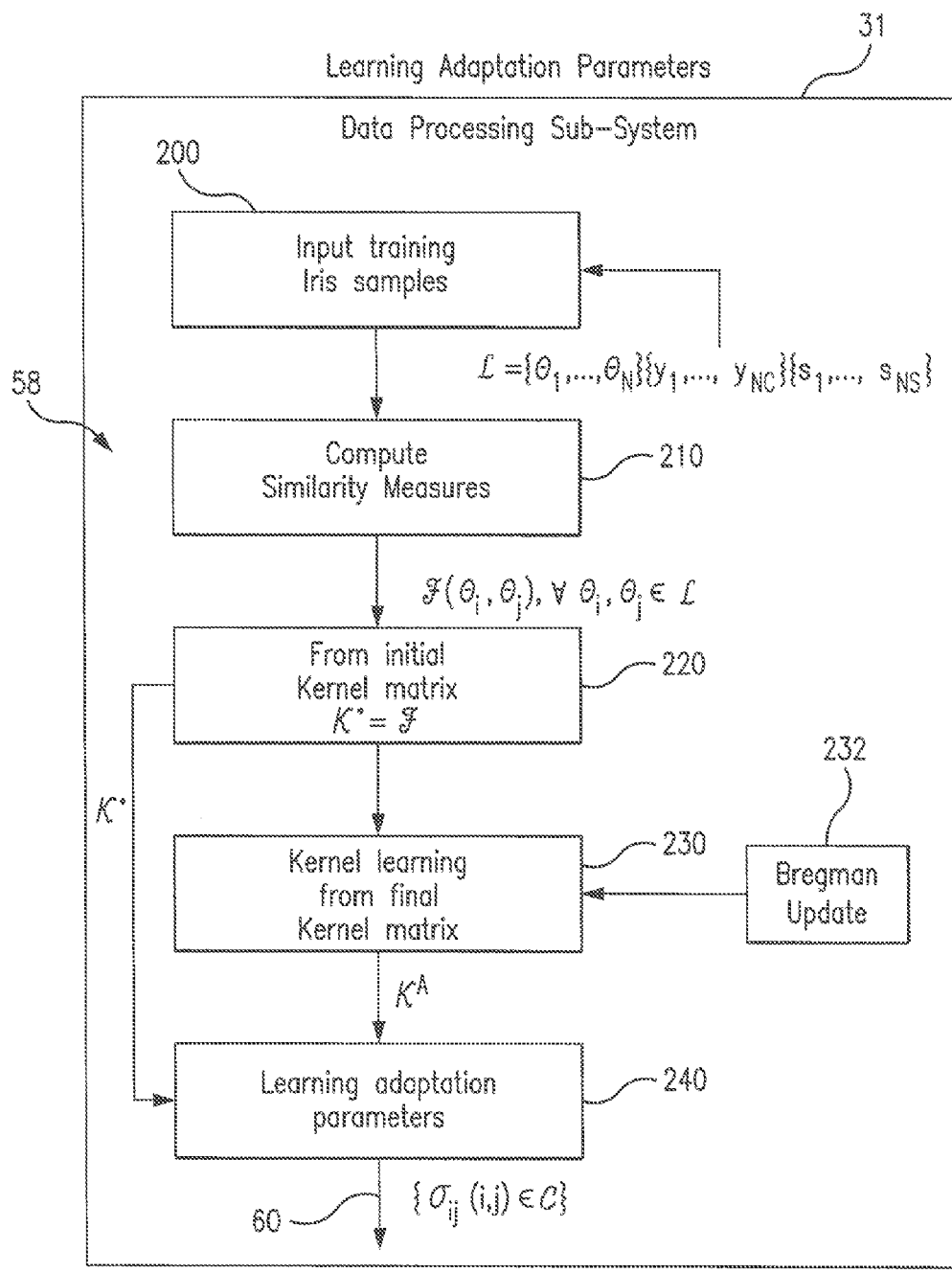
FIG. 5 is a flow chart diagram representing the algorithm for learning adaptation parameters.

The sensor adaptation sub-system 54, as presented in FIGS. 3, 4, and 5, includes a learning adaptation parameters sub-system 58 which, as will be detailed in further paragraphs, produces adaptation parameters 60.

The sensor adaptation sub-system 54 further includes a similarity measure computation sub-system (also referred to herein as kernel construction unit) 62 receiving the test iris code 52 from the iris code extraction sub-system 50. A dataset of training iris samples (codes) are also received at the similarity measure computation sub-system 62 (optionally, from the database 34) to produce similarity measures 64.

A sensor adaptation unit 66, also referred to herein as a kernel adaptation unit, is operatively coupled to the similarity measure computation sub-system 62 to process the similarity measures 64 in view of the adaptation parameters 60 received from the learning adaptation parameters sub-system 58. The sensor adaptation unit 66, based on the similarity measure 64 and adaptation parameters 60, produces the adapted kernel function values 68 which are used by the matching sub-system 70 for computing the adapted distances from the adapted kernel values 68 and for performing verification (or identification) using the adapted distance measures computed for the test iris sample and the enrollment iris sample in the transformation space.

Since the iris recognition system 30 is designed for authentication purposes, i.e. for recognition of humans, in future description, the term "class" refers to a human to be recognized by the present iris recognition system.

The sensor adaptation sub-system 54 operates to learn a transformation which, being applied to the iris samples (or feature vectors extracted from these iris samples) acquired by different sensors, finds the similar feature vectors and different feature vectors. The feature vectors found to be similar are considered to belong to the same class, i.e. to the same human under study. Similarly, the feature vectors found to be different, are considered to belong to different persons during the verification stage of the iris recognition system operation.

For example, for recognizing two humans, the iris recognition system 30 attributes data in two separate classes, for example, for one human as class A, and for another human as class B. As an example, the system can operate with the following feature vectors which are extracted from the iris images of the human A or B, respectively: features f1 and f2 corresponding to the human A (class A), and features f3 and f4 corresponding to the human B (class B).

During the training session, i.e., during the learning adaptation parameters stage of operation, the sensor adaptation sub-system 54 attempts to learn a transformation T, which, after being applied to the feature vectors f1, f2, f3 and f4, will produce T (f1) and T (f2) which are close one to another, and after applying the learned transformation T to the vector features f3 and f4 of the human B, the transformation T (f3) and T (f4) will also be very close. However, T (f1) and T (f2), respectively, will be very different from T (f3) and T (f4).

As seen in FIGS. 3-4, and presented in previous paragraphs, the sensor adaptation sub-system 54 operates in two stages, including the learning adaptation parameters stage (also referred to herein as a training stage) which produces adaptation parameters 60 based on the training iris codes extracted from the samples acquired with the sensor 36 and iris codes extracted from the samples acquired by sensor 48, and the sensor adaptation stage which is performed in the verification stage (also referred to herein as a testing stage) of the iris recognition system 30 operation. The similarity measure computation is performed during both the training and the verification stages of the iris recognition system operation prior to the sensor adaptation.

Prior to the description of the details of the present framework for kernel learning and the sensor adaptation, detailed description of the similarity measure computation is introduced to facilitate understanding of the operation of the present system 30 presented in FIGS. 3-7.

Similarity Measure for Iris Biometrics

The similarity measure plays an important role in developing of an efficient sensor adaptation algorithm underlying the operation of the present system, and particularly, the sensor adaptation sub-system 66.

Notations:
Let $$\mathcal{B}^D = \{0, 1\}^D \quad \text{(Eq. 1)}$$

be the space of all binary vectors of length D. Let the iris samples available during training be denoted by $$\mathcal{L} = \{\theta_1, \theta_2, \ldots, \theta_N\} \quad \text{(Eq. 2)}$$

Here, the $i^{th}$ iris sample $$\theta_i \in \mathcal{B}^{2D}, \theta_i^T = [x_i^T m_i^T] \quad \text{(Eq. 3)}$$

where $x_i \in \mathcal{B}^D$ is the $i^{th}$ iris code, and $m_i \in \mathcal{B}^D$ is the corresponding mask.

Let $y_i \in \{1, 2, \ldots N_c\}$ denote the class label of the $i^{th}$ iris sample, and $s_i \in \{1, 2, \ldots, N_s\}$ denote the sensor from which it was acquired, where, N denotes the number of training samples, D the dimension of the iris codes, $N_c$ the number of subjects enrolled, and $N_s$ the number of sensors used for acquisition.

The $j^{th}$ bit in the $i^{th}$ iris code is denoted by $x_i(j)$, which is called a "valid" bit if the corresponding masking bit $m_i(j)=1$.

Furthermore, let $\wedge$, $\oplus$ and $\neg$ denote the logical AND, XOR and NOT operations, respectively.

The normalized Hamming distance $\mathcal{H}(\theta_i,\theta_j)$ between two iris samples $\theta_i$ and $\theta_j$ is defined as the fraction of the valid bits that disagree:

$$\mathcal{H}(\theta_i, \theta_j) = \frac{\sum_{l=1}^{D} \{m_i(l) \wedge m_j(l) \wedge (x_i(l) \oplus x_j(l))\}}{\sum_{l=1}^{D} \{m_i(l) \wedge m_j(l)\}} \quad \text{(Eq. 4)}$$

Definitions

Given two iris samples $\theta_i$ and $\theta_j$, the joint agreement $\eta_A(\theta_i,\theta_j)$ is defined as the number of valid bits that agree between $\theta_i$ and $\theta_j$. Similarly, the joint disagreement $\eta_D(\theta_i,\theta_j)$ is defined as the number of valid bits that disagree between $\theta_i$ and $\theta_j$. The joint length $\eta(\theta_i,\theta_j)$ is the number of bits which are valid in both $\theta_i$ and $\theta_j$. Hence, $$\eta_A(\theta_i, \theta_j) = \sum_{l=1}^{D} \{m_i(l) \wedge m_j(l) \wedge \neg (x_i(l) \oplus x_j(l))\} \quad \text{(Eq. 5)}$$

$$\eta_D(\theta_i, \theta_j) = \sum_{l=1}^{D} \{m_i(l) \wedge m_j(l) \wedge (x_i(l) \oplus x_j(l))\} \quad \text{(Eq. 6)}$$

$$\eta(\theta_i, \theta_j) = \sum_{l=1}^{D} (m_i(l) \wedge m_j(l)) \quad \text{(Eq. 7)}$$

The joint agreement, the joint disagreement and the joint length are related by $$\eta_A(\theta_i,\theta_j) + \eta_D(\theta_i,\theta_j) = \eta(\theta_i,\theta_j) \quad \text{(Eq. 8)}$$

Deriving a Similarity Measure

The normalized Hamming distance $\mathcal{H}(\theta_i,\theta_j)$ between two iris samples $\theta_i$ and $\theta_j$ can be expressed in terms of the joint agreement and joint disagreement as $$\mathcal{H}(\theta_i, \theta_j) = \frac{1}{4} + \frac{1}{4} - 2\frac{\{\eta_A(\theta_i, \theta_j) - \eta_D(\theta_i, \theta_j)\}}{4\eta(\theta_i, \theta_j)} \quad \text{(Eq. 9)}$$

Furthermore, from Eqs. (4) and (6-8), $$\begin{aligned}\mathcal{H}(\theta_i, \theta_j) &= \frac{\eta_D(\theta_i, \theta_j)}{\eta(\theta_i, \theta_j)} \\ &= \frac{2\eta_D(\theta_i, \theta_j) + 2\eta_D(\theta_i, \theta_j)}{4\eta(\theta_i, \theta_j)} \\ &= \frac{2\{\eta(\theta_i, \theta_j) - \eta_A(\theta_i, \theta_j)\} + 2\eta_D(\theta_i, \theta_j)}{4\eta(\theta_i, \theta_j)} \\ &= \frac{\eta(\theta_i, \theta_j)}{4\eta(\theta_i, \theta_j)} + \frac{\eta(\theta_i, \theta_j)}{4\eta(\theta_i, \theta_j)} - 2\frac{\{\eta_A(\theta_i, \theta_j) - \eta_D(\theta_i, \theta_j)\}}{4\eta(\theta_i, \theta_j)} \\ &= \frac{1}{4} + \frac{1}{4} - 2\frac{\{\eta_A(\theta_i, \theta_j) - \eta_D(\theta_i, \theta_j)\}}{4\eta(\theta_i, \theta_j)}\end{aligned} \quad \text{(Eq. 10)}$$

Under the special case when $\theta_i = \theta_j$:

$$\eta_A(\theta_i,\theta_j) = \eta(\theta_i,\theta_j) \quad \text{(Eq. 11)}$$

$$\eta_D(\theta_i,\theta_j) = 0 \quad \text{(Eq. 12)}$$

$$\frac{\{\eta_A(\theta_i, \theta_j) - \eta_D(\theta_i, \theta_j)\}}{4\eta(\theta_i, \theta_j)} = \frac{1}{4} \quad \text{(Eq. 13)}$$

As seen in Eq. 13, a meaningful similarity measure between iris codes $\theta_i$ and $\theta_j$ is the difference between the fraction of valid bits that agree and the fraction of valid bits that disagree $$\frac{\{\eta_A(\theta_i, \theta_j) - \eta_D(\theta_i, \theta_j)\}}{\eta(\theta_i, \theta_j)}.$$

Therefore, the similarity measure between iris samples $\theta_i$ and $\theta_j$ is defined as $$\mathcal{F}(\theta_i, \theta_j) = \frac{\eta_A(\theta_i, \theta_j) - \eta_D(\theta_i, \theta_j)}{4\eta(\theta_i, \theta_j)} \quad \text{(Eq. 14)}$$

$$\mathcal{F}(\theta_i, \theta_i) = \frac{1}{4} \quad \text{(Eq. 15)}$$

The factor 4 in the denominator is just a scale factor to simplify our equations, as will become clear from the following paragraphs.

Properties of the Similarity Function

Property 1: $\mathcal{H}(\theta_i, \theta_j)$ and $\mathcal{F}(\theta_i, \theta_j)$ are related by $$\mathcal{H}(\theta_i, \theta_j) = \mathcal{F}(\theta_i, \theta_i) + \mathcal{F}(\theta_j, \theta_j) - 2\mathcal{F}(\theta_i, \theta_j) \quad \text{(Eq. 16)}$$

Proof: Follows by substituting Eq. 15 and Eq. 14 in Eq. 9.

Property 2: When the iris samples have identical occlusion, $\mathcal{F}(\theta_i, \theta_j)$ becomes a valid kernel function.

Proof:

When the iris samples have same occlusion, the masks of different iris samples are identical so $m_1 = m_2 = \ldots m_N$.

A function f is defined as: f: $\beta^{2D} \to \mathbb{R}^D$, whose $l^{th}$ output component is given by $$f_l(\theta) = \frac{\left(x(l) - \frac{1}{2}\right)m(l)}{\sqrt{\sum_{k=1}^{D} m(k)}}, l = 1, 2 \ldots, D \quad \text{(Eq. 17)}$$

One can derive that $$\sum_{l=1}^{D}\left(x_i(l) - \frac{1}{2}\right)m_i(l)\left(x_j(l) - \frac{1}{2}\right)m_j(l) = \frac{\eta_A(\theta_i, \theta_j) - \eta_D(\theta_i, \theta_j)}{4} \quad \text{(Eq. 18)}$$

Furthermore, under the identical mask assumption, $\Sigma_{l=1}^{D} m_i(l) = \eta(\theta_i, \theta_j)$, $\forall \theta_i, \theta_j \in \mathcal{B}^{2D}$. Hence, $\mathcal{F}(\theta_i, \theta_j)$ can be rewritten as $$\mathcal{F}(\theta_i, \theta_j) = \frac{\eta_A(\theta_i, \theta_j) - \eta_D(\theta_i, \theta_j)}{4\sqrt{\eta(\theta_i, \theta_j)}\sqrt{\eta(\theta_i, \theta_j)}} \quad \text{(Eq. 19)}$$

$$= \frac{\sum_{l=1}^{D}\left(x_i(l) - \frac{1}{2}\right)m_i(l)\left(x_j(l) - \frac{1}{2}\right)m_j(l)}{\sqrt{\sum_{k=1}^{D} m_i(k)}\sqrt{\sum_{k=1}^{D} m_j(k)}}$$

$$\mathcal{F}(\theta_i, \theta_j) = f(\theta_i)^T f(\theta_j) \quad \text{(Eq. 20)}$$

By definition, the similarity measure $\mathcal{F}(\theta_i, \theta_j)$ is a kernel function (C. M. Bishop, *Pattern Recognition and Machine Learning (Information Science and Statistics)*, Springer, 1 ed., 2007), since it can be written in the form $f(\theta_i)^T f(\theta_j)$.

Framework for Kernel Learning

A kernel based approach is used for the subject sensor adaptation technique.

The framework, also referred to herein as the sensor adaptation sub-system 54, for learning transformations of iris biometrics having desired properties is explained in the following paragraphs. These transformations can be represented using kernel functions. The space of allowable transformations for iris biometrics and the constraints they should satisfy are detailed in the following paragraphs.

Space of Transformations for Iris Biometrics

Iris recognition techniques perform verification by matching the binary iris codes. Hence, the set of allowable transformations for iris codes is to be established.

Boolean transformations, such as permutations, map one binary vector to another. However, learning Boolean transformations satisfying desired constraints is complex. For this reason, the class of transformations $\phi: \beta^{2D} \to \mathbb{R}^M$, which maps iris codes to real-valued vectors (of some dimension M) is chosen in the present system. The corresponding kernel function is presented by $$\mathcal{K}(\theta_i, \theta_j) = \phi(\theta_i)^T \phi(\theta_j) \quad \text{(Eq. 21)}$$

Let $\mathcal{K} \in \mathbb{R}^{N \times N}$ denote the kernel matrix, whose $(i,j)^{th}$ entry is the kernel function between $\theta_i$ and $\theta_j$. In other words, $\mathcal{K}_{ij} = \mathcal{K}(\theta_i, \theta_j)$.

Since the transformed feature vectors are real-valued, the squared Euclidean distance $\zeta_e(\cdot, \cdot)$ is used as the distance metric in the transformed space. It is related to the kernel function by $$\zeta_e(\phi(\theta_i), \phi(\theta_j)) = \|\phi(\theta_i) - \phi(\theta_j)\|^2 \quad \text{(Eq. 22)}$$

$$= \phi(\theta_i)^T \phi(\theta_i) + \phi(\theta_j)^T \phi(\theta_j) - 2\phi(\theta_i)^T \phi(\theta_j)$$

$$= \mathcal{K}_{ii} + \mathcal{K}_{jj} - 2\mathcal{K}_{ij}$$

For notational simplicity, $\zeta_e(\phi(\theta_i), \phi(\theta_j))$ is denoted by $\zeta_{ij}$.

Constraints to be Satisfied

The constraints that the transformed samples must satisfy include the (a) distance preserving constraints and (b) application-specific constraints.

Distance Preserving Constraints

For the learned transformation to perform efficiently on the test samples, the squared Euclidean distance in the transformed space should capture the distance relationships between the original iris samples. Learning transformations preserving the local distances in the original and transformed spaces is a well explored area in machine learning, called manifold learning. These methods are restricted to constraining the local distances, since distances between non-local points are often difficult to compute. However, since the normalized Hamming distance is a reasonable distance measure for iris codes, it is imposed in the subject algorithm that the distances between all the training samples should be preserved by the learned transformation. This can be achieved by constraining the squared Euclidean distance between the transformed vectors to be close to the normalized Hamming distance between the original vectors.

$$\zeta_{ij} \approx \mathcal{H}(\theta_i, \theta_j) \quad \text{(Eq. 23)}$$

Application-specific Constraints

Often, application-specific constraints need to be introduced into the optimization framework to obtain the desired results. For example, K. Q. Weinberger, et al., "Learning a kernel matrix for nonlinear dimensionality reduction," in *Proceedings of the twenty-first international conference on Machine learning*, ICML '04, (New York, N.Y., USA), pp. 106-, ACM, 2004, learned the transformations maximizing the variance between samples. Maximum Mean Discrepancy (MMD) constraints were used for transfer learning by S. J. Pan, et al., "Domain adaptation via transfer component analysis," in *Proceedings of the 21$^{st}$ international joint*

*conference on Artificial intelligence,* IJCAI '09, (San Francisco, Calif., USA), pp. 1187-1192, Morgan Kaufmann Publishers Inc., 2009.

Let the application specific constraints to be satisfied by the learned transformation be denoted by $$C(\phi) \leq 0 \quad \text{(Eq. 24)}$$

where the function $C(\cdot)$ depends on the constraints being imposed.

Kernel Learning

Having specified the space of allowable transformations and the constraints they should satisfy, the kernel learning problem can be expressed as $$\phi^*(\cdot) = \underset{\phi: B^{2D} \to \mathbb{R}^M}{\operatorname{argmin}} \sum_{\theta_i, \theta_j \in \mathcal{L}} \zeta_d(\zeta_{ij}, \mathcal{H}(\theta_i, \theta_j)) \quad \text{(Eq. 25)}$$

subject to the constraints $C(\phi) \leq 0$, where $\zeta_{ij} = \zeta_e(\phi(\theta_i), \phi(\theta_j))$, $\zeta_d(\cdot, \cdot)$ is a suitable distance measure between the squared Euclidean distance in the transformed space and the normalized Hamming distance in the original space of iris codes, and $\phi^*(\cdot)$ is the optimal mapping.

Special Case

When only the distance preservation constraints are imposed and iris samples have identical occlusion, the optimal kernel function is equal to the similarity measure $\mathcal{F}$.

Under distance preservation constrains alone, the kernel learning problem, Eq. 25, can be expressed in terms of the kernel matrix as $$K^* = \underset{K \in S}{\operatorname{argmin}} \sum_{\theta_i, \theta_j \in \mathcal{L}} \zeta_d(K_{ii} + K_{jj} - 2K_{ij}, \mathcal{H}(\theta_i, \theta_j)) \quad \text{(Eq. 26)}$$

In Eq. 26, $\zeta_d(\cdot, \cdot)$ is a suitable distance measure between the squared Euclidean distance in the transformed space and the normalized Hamming distance in the original space of iris codes, and each $K_{ii}, K_{ij}, K_{jj}$ denotes the kernel matrix whose respective $(i,i)^{th}$, $(i,j)^{th}$, or $(j,j)^{th}$ entry is the kernel function between corresponding samples, i.e., $K_{ii} = K(\theta_i, \theta_i)$, $K_{ij} = K(\theta_i, \theta_j)$, $K_{jj} = K(\theta_j, \theta_j)$.

Substituting Eq. 16 in the optimization problem (Eq. 33), the cost function to be minimized becomes $$\sum_{\theta_i, \theta_j \in \mathcal{L}} \zeta_d(K_{ii} + K_{jj} - 2K_{ij}, \mathcal{H}(\theta_i, \theta_j)) = \quad \text{(Eq. 27)}$$

$$\sum_{\theta_i, \theta_j \in \mathcal{L}} \zeta_d(K_{ii} + K_{jj} - 2K_{ij}, \mathcal{F}_{ii} + \mathcal{F}_{jj} - 2\mathcal{F}_{ij})$$

This cost is minimized when the kernel matrix $K$ is equal to the similarity matrix $\mathcal{F}$. Furthermore, under the identical mask condition, the similarity matrix is positive semi-definite, as proven in the previous paragraphs in the properties of the similarity function. Hence the optimal kernel function $K^*$ is equal to the similarity measure $\mathcal{F}$ under the identical mask assumption.

Sensor Adaptation

Having developed a general framework for learning kernel functions for iris biometrics, it will be presented in the following paragraphs how it can be utilized for the sensor adaptation. The sensor adaptation algorithm reduces the sensor mismatch problem and improves the verification performance when the sensor used for enrollment differs from the sensor used for testing. Since the algorithm has to be incorporated into existing recognition systems, it should be fast and introduce minimal changes to the existing recognition pipeline.

As shown in FIG. 3, the enrollment samples are acquired using the sensor 36 and testing samples are acquired using the sensor 48, where these sensors differ, for example, in the sensor technology or the location or type of illumination.

It is assumed that iris samples acquired by both sensors are available for a small number of subjects. By considering the samples acquired by the sensor 48 as the target domain and those enrolled by the sensor 32 as the source domain, this becomes the standard domain adaptation problem in machine learning. However, existing algorithms for domain adaptation are typically based on real-valued features. A possible solution is to convert the original iris codes from binary to real values, use an existing domain adaptation algorithm and quantize the adapted features to obtain the final iris codes for matching. However, this may lead to a reduced performance due to quantization, and also may lead to significant changes in the existing iris recognition systems.

In the subject iris recognition system 30, the binary iris codes are transformed to real-valued features using the kernel-learning framework presented in previous paragraphs. Matching is then performed using the transformed iris samples. In addition to the distance preserving constraints, the application specific constraints are incorporated for sensor adaptation, as will be detailed infra.

Inter-sensor Constraints

In order to test samples from the sensor 48 accurately using samples enrolled by the sensor 36, the samples acquired by the sensor 48 should be close to same-class (same person) samples acquired by the sensor 36. Furthermore, they should be spaced far from the samples acquired by the sensor 36 belonging to different classes (different persons). Therefore, it is required in the processing of the samples that the transformation should bring samples of the same class acquired by different sensors closer, and move those from different classes farther in the transformed space, K. Saenko, et al., "Adapting visual category models to new domains," in *European Conference on Computer Vision*, pp. 213-226, 2010. These constraints are given by $$\zeta_{ij} \leq d_u, \text{ if } y_i = y_j, s_i \neq s_j \quad \text{(Eq. 28)}$$

$$\zeta_{ij} \geq d_l, \text{ if } y_i \neq y_j, s_i \neq s_j \quad \text{(Eq. 29)}$$

Intra-sensor Constraints

Often sensors available for iris acquisition differ greatly in accuracy. Usually, iris samples are enrolled using an older (outdated) sensor, which may have an accuracy much lower than that of the newer sensor acquiring the test samples for verification. Hence, the cross-sensor performance can be limited by the performance characteristics of the enrollment outdated sensor.

To handle the varying accuracies of two sensors, additional intra-sensor constraints are introduced. For each individual sensor, the intra-sensor constrains impose that the distance between the same-class samples should be small, and the distance between different class samples should be large. These constraints have been used in the machine learning literature for Metric Learning (J. V. Davis, et al., "Information-theoretic metric learning," in *International*

*Conference on Machine Learning*, pp. 209-216, 2007), and can improve the performance of the older sensor.

These constraints are expressed as $$\zeta_{ij} \leq d_u, \text{ if } y_i = y_j, s_i = s_j \quad \text{(Eq. 30)}$$

$$\zeta_{ij} \geq d_l, \text{ if } y_i \neq y_j, s_i = s_j \quad \text{(Eq. 31)}$$

Transform Learning

The transform learning problem may be expressed as $$\phi^A(\cdot) = \underset{\phi: \mathcal{B}^{2D} \to \mathbb{R}^M}{\arg\min} \sum_{\theta_i, \theta_j \in \mathcal{L}} \zeta_d(\zeta_{ij}, \mathcal{H}(\theta_i, \theta_j)) \quad \text{(Eq. 32)}$$

subject to the constraints presented by Eqs. (28), (29), (30), (31), where $\zeta_d$ is a suitable distance measure between the Euclidean distance in the transformed space and the normalized Hamming distance in the original space of iris codes, and $\phi^A(\cdot)$ is the optimal transformation for sensor adaptation.

At this point, a parametric model for $\phi$ have been specified and its parameters have been learned by solving the optimization problem. However, it is not clear what would be a good model for $\phi$, and bad choices could affect the classification performance. So, instead of a parametric approach, the optimization problem is expressed herein in terms of the kernel functions, and the optimal kernel function is computed.

By substituting (Eq. 22), the optimization problem can be rewritten in terms of the kernel matrix as $$K^A = \arg\min_{K \in S} \sum_{\theta_i, \theta_j \in \mathcal{L}} \zeta_d(K_{ii} + K_{jj} - 2K_{ij}, \mathcal{H}(\theta_i, \theta_j)) \quad \text{(Eq. 33)}$$

subject to the constraints, $$\forall \theta_i, \theta_j \in \mathcal{L} \quad \text{(Eq. 34)}$$

$$K_{ii} + K_{jj} - 2K_{ij} \geq d_u, \text{ if } y_i = y_j \quad \text{(Eq. 35)}$$

$$K_{ii} + K_{jj} - 2K_{ij} \leq d_l, \text{ if } y_i \neq y_j \quad \text{(Eq. 36)}$$

where $$K^A(\theta_i, \theta_j) = \phi^A(\theta_i)^T \phi^A(\theta_j) \quad \text{(Eq. 37)}$$

is the adapted kernel matrix corresponding to the optimal transformation, and S is the space of all positive semi definite matrices.

Direct Solution

When $\zeta_d(\cdot,\cdot)$ is used as the Euclidean distance, the optimization problem presented in previous paragraphs becomes convex, since it involves the minimization of a quadratic cost function subject to linear constraints, and the global minimum can be obtained. To perform verification, the kernel function between the test samples and the training samples can be obtained by solving the optimization problem supra. Distances in the transformed space can be computed using (Eq. 22) and used for matching, as will be defined infra.

However, in practical applications, test iris samples are acquired at various times. Solving the optimization problem for each test sample is computationally inefficient. An efficient solution to this optimization problem has been developed as a part of the iris recognition system 30 based on Bregman projections (B. Kulis, et al., "Learning low-rank kernel matrices," in *International Conference on Machine Learning*, pp. 505-512, 2006), utilizing the similarity measure and the property of the normalized Hamming distance, supra.

Efficient Solution

Substituting (Eq. 16) in the optimization problem (Eq. 33), the cost function to be minimized becomes $$\sum_{\theta_i, \theta_j \in \mathcal{L}} \zeta_d(K_{ii} + K_{jj} - 2K_{ij}, \mathcal{H}(\theta_i, \theta_j)) = \quad \text{(Eq. 38)}$$

$$\sum_{\theta_i, \theta_j \in \mathcal{L}} \zeta_d(K_{ii} + K_{jj} - 2K_{ij}, \mathcal{F}_{ii} + \mathcal{F}_{jj} - 2\mathcal{F}_{ij})$$

The cost function given in Eq. 38 can be minimized by minimizing the distance between the Kernel matrix $K$ and the similarity matrix $\mathcal{F}$.

A suitable distance measure between the two matrices is the logDet divergence. The logDet divergence was originally defined for positive definite matrices, but extended to positive semi-definite matrices by B. Kulis, et al., "Learning low-rank kernel matrices," in *International Conference on Machine Learning*, pp. 505-512, 2006. When the masks are identical, the similarity measure is a kernel function, and hence the corresponding similarity matrix $\mathcal{F}$ will be positive semi-definite. In other cases, it is verified infra that the similarity matrix $\mathcal{F}$ is positive semi-definite.

The modified optimization problem is given by $$K^A = \arg\min_{K \in S} \zeta_l(K, \mathcal{F}) \quad \text{(Eq. 39)}$$

subject to the constraints, $$\forall \theta_i, \theta_j \in \mathcal{L} \quad \text{(Eq. 40)}$$

$$K_{ii} + K_{jj} - 2K_{ij} \geq d_u, \text{ if } y_i = y_j \quad \text{(Eq. 41)}$$

$$K_{ii} + K_{jj} - 2K_{ij} \leq d_l, \text{ if } y_i \neq y_j \quad \text{(Eq. 42)}$$

where S is the space of all positive semi-definite matrices, $\mathcal{F}$ is the similarity matrix obtained from the training samples, $K^A$ is the adapted kernel matrix, and $\zeta_l(\cdot,\cdot)$ is the logDet divergence (B. Kulis, etal., "Learning low-rank kernel matrices", in *International Conference on Machine Learning*, pp. 505-512, 2006).

The optimization problem presented in Eqs. 39-42 is convex and has a global minimum. Furthermore, the cost function presented in Eq. 38 is a Bregman divergence).

An optimization problem consisting of the minimization of a Bregman divergence subject to linear inequality constraints can be solved efficiently using Bregman projections (L. M. and Bregman, "The relaxation method of finding the common point of convex sets and its application to the solution of problems in convex programming," *USSR Computational Mathematics and Mathematical Physics*, Vol. 7, No. 3, pp. 200-217, 1967). Bregman projections choose one constraint per iteration and perform a Bregman projection so that the current solution satisfies the chosen constraint. This process is repeated in a cyclic manner until convergence. Under mild conditions, it has been shown that the Bregman projection technique converges to the globally optimal solution.

Moreover, the learned kernel can be parameterized by using a set of the "sensor adaptation" parameters, so, the proposed solution has an effective "online" version. As will become evident in the following paragraphs, the efficient optimization problem (Eq. 39) does not have to be solved every time a new test sample is acquired, as is the case for (Eq. 33).

In the subject algorithm, every constraint is obtained by selecting two training samples and constraining the kernel function between them.

Let $\mathcal{C}$ be the set of all constraints used for sensor adaptation. Hence, $$\mathcal{C} = \{(i,j)\}, \tag{Eq. 43}$$

where $(i,j)$ corresponds to a constraint imposed between training samples $\theta_i$ and $\theta_j$.

Let the constraint chosen in the $t^{th}$ iteration be formed using the $t_i^{th}$ and the $t_j^{th}$ data samples where $(t_i, t_j) \in \mathcal{C}$. Hence, Eqs. 28-31 can be concisely expressed as $$\delta_{t_i t_j} K_{t_i t_j} \leq d_{t_i t_j} \tag{Eq. 44}$$

$$\delta_{t_i t_j} = 1 \text{ and } d_{t_i t_j} = d_l \text{ if } y_{t_i} \neq y_{t_j} \tag{Eq. 45}$$

$$\delta_{t_i t_j} = -1 \text{ and } d_{t_i t_j} = -d_u \text{ if } y_{t_i} = y_{t_j} \tag{Eq. 46}$$

Furthermore, let $e_{t_i} \in \mathbb{R}^N$ be a vector with value 1 at the $t_i^{th}$ entry and 0 otherwise. At the $(t+1)^{th}$ iteration, the Bregman update is given by $$K^{t+1} = K^t + \beta_{t+1} K^t e_{t_i} e_{t_j}^T K^t \tag{Eq. 47}$$

where $K^0 = \mathcal{F}$, $e_{t_j}^T$ is the transpose of the vector $e_{t_j}$, and the scalar $\beta_{t+1}$ is computed at each iteration using the Algorithm presented in FIG. 7.

Learning Adaptation Parameters

Since only a finite number of constraints are applied, and Bregman projections cyclically select each constraint for updating the kernel, the same constraint is chosen multiple times during optimization. Due to the linearity of the kernel update Eq. 47, the contribution of each constraint to the final solution can be expressed as the sum of its contribution to each iteration of the algorithm. Let $\tau$ be the total number of iterations for convergence during adaptation. Then $$K^A = K^T = K^0 + \sum_{t=1}^{T} \beta_t K^{t-1} e_{t_i} e_{t_j}^T K^{t-1} \tag{Eq. 48}$$

$$= K^0 + \sum_{(i,j) \in \mathcal{C}} \sigma_{ij} K^0 e_i e_j^T K^0$$

where $\sigma_{ij}$, called the adaptation parameters, represent the contribution made by the $(i,j)^{th}$ constraint to the adapted kernel. These parameters can be estimated using just the training samples during the learning stage, irrespective of testing samples.

Let $\Sigma \in \mathbb{R}^{N \times N}$ be the adaptation matrix, whose $(i,j)^{th}$ entry gives the adaptation parameter $\sigma_{ij}$. Eq. 48 can be written using the matrix notation as $$K^A = K^0 + K^0 \Sigma K^0 \tag{Eq. 49}$$

Hence, $\Sigma$ can be computed as $$\Sigma = (K^0)^{-1} (K^A - K^0)(K^0)^{-1} = (\mathcal{F})^{-1} (K^A - \mathcal{F})$$
$$(\mathcal{F})^{-1} \tag{Eq. 50}$$

Sensor Adaptation During Testing

Given a testing sample $\theta_t$, its adapted kernel function is first evaluated with all the training samples $K^A(\theta_t, \theta)$, $\theta \in \mathcal{L}$, using the adaptation parameters $\Sigma$ and similarity measure $\mathcal{F}(\theta_t, \theta)$ as $$K^A(\theta_t, \theta) = \mathcal{F}(\theta_t, \theta) + \sum_{ij} \sigma_{ij} \mathcal{F}(\theta_t, \theta_i) \mathcal{F}(\theta_j, \theta) \tag{Eq. 51}$$

The adapted kernel computation does not involve solving the optimization problem for each test sample, which makes it extremely efficient.

Iris Matching

Given a test iris sample $\theta_t$, its adapted kernel function values $K^A(\theta_t, \theta)$, $\theta \in \mathcal{L}$ with all the training samples are first obtained, supra. The squared Euclidean distance in the transformed space is then computed using Eq. 16 as $$\zeta_e(\phi^A(\theta_t), \phi^A(\theta)) = K^A(\theta_t, \theta_t) + K^A(\theta, \theta) - 2K^A(\theta_t, \theta), \forall \theta \in \mathcal{L} \tag{Eq. 52}$$

Verification or identification is performed as required by the application using this distance. For instance, if the squared Euclidean distance between the test sample and the sample corresponding to the claimed identity is greater than a predefined threshold in the transformed space, the test sample is verified as genuine. The major steps in the subject method summarizing the operation of the subject iris recognition system is summarized in FIGS. 3-4 and in Algorithms presented in FIGS. 5-7.

Referring to FIG. 4, representing the flow chart diagram of the process underlying the operation of the present iris recognition system and controlled by the data processing sub-system 31 in accordance with the subject algorithm, the sensor adaption sub-system 54 operates in the training stage and the testing stage which follows the training stage. The matching stage following the testing stage, and is completed with the decision making of the ingenuity or failure of authentication.

As shown in FIG. 4, the process starts in Step 100 of the training stage, where the input training iris samples are input into the system for a number $N_c$ of subjects (classes) acquired by a number $N_s$ of different sensors. From the Step 100, the process passes to the Step 110 for learning transforms which satisfy predetermined constraints imposed on the transforms. At this Step 110, the sensor adaptation sub-system 54 attempts to learn transformations which would provide that after applying the transformations on the feature vectors extracted from the training iris samples, the feature vectors belonging to the same person (class) are very similar, and the feature vectors belonging to different subjects (classes) are different, irrespective of the sensor acquiring the training iris samples. In Step 110, the logic uses Eqs. 14, 39-42, as well as 47-48 for computations.

From the Step 110, the logic flows to Step 120 where the adaptation parameters are computed in accordance with Eqs. 48-50.

Upon completion of the computation of the adaptation parameters, the logic flows to the testing stage of the system operation where in Step 130, the test iris sample $\theta_t$ is input and the initial test matrix is computed for the test iris sample and all the training iris samples provided in the Step 110.

From the Step 130, the logic follow to the Step 140 "Computing Test Matrix" for the test iris sample and the training iris samples. Upon completion of the test matrix computation in the Step 140 based on the similarity measure in Eq. 14 calculated for the test iris sample and the training iris samples, the logic proceeds to Step 150 in which the adapted test matrix is computed based on the adaption parameters produced at the training stage of the system operation in accordance with Eq. 51.

Further, the testing stage is followed by the matching stage 70 which starts in Step 160 by providing a $\theta_{en}$ enrollment iris sample. In subsequent Step 170, a distance measure (such as, for example, the squared Euclidean distance) between the test iris sample and enrollment iris sample in the transformation space is computed by Eq. 52, and the computed distance measure is compared in Step 180 with a predetermined threshold.

A decision is made in Step 190 based on the results of the comparison generated in block 180. The test iris sample is determined to be genuine if the distance measure is below the predetermined threshold, and failure of authentication is established if the distance measure exceeds the threshold.

Referring to FIG. 5, which details the operation of the Learning Adaptation Parameters (Training) sub-system 58 of FIGS. 3-4, the procedure starts in block 200 where, similar to the Step 100 presented in FIG. 4, the training iris samples are input into the system. In the subsequent Step 210, similarity measures are computed for each pair of training iris samples, $\theta_i$, $\theta_j$ in accordance with Eq. 14.

Based on the computed similarity measure, an initial kernel matrix is calculated in Step 220, and the initial kernel matrix is subsequently updated iteratively in Step 230 to form a final kernel matrix in accordance with Eqs. 47-48. The process of forming the final kernel matrix is optimized by applying Bergman update routine 232 detailed in FIG. 7.

Upon forming the final kernel matrix, the logic flows to Step 240 where, based on the final kernel matrix and the initial similarity matrix calculated in Step 220, the adaptation parameters 60 are computed in accordance with Eqs. 48-50.

Figure 6:
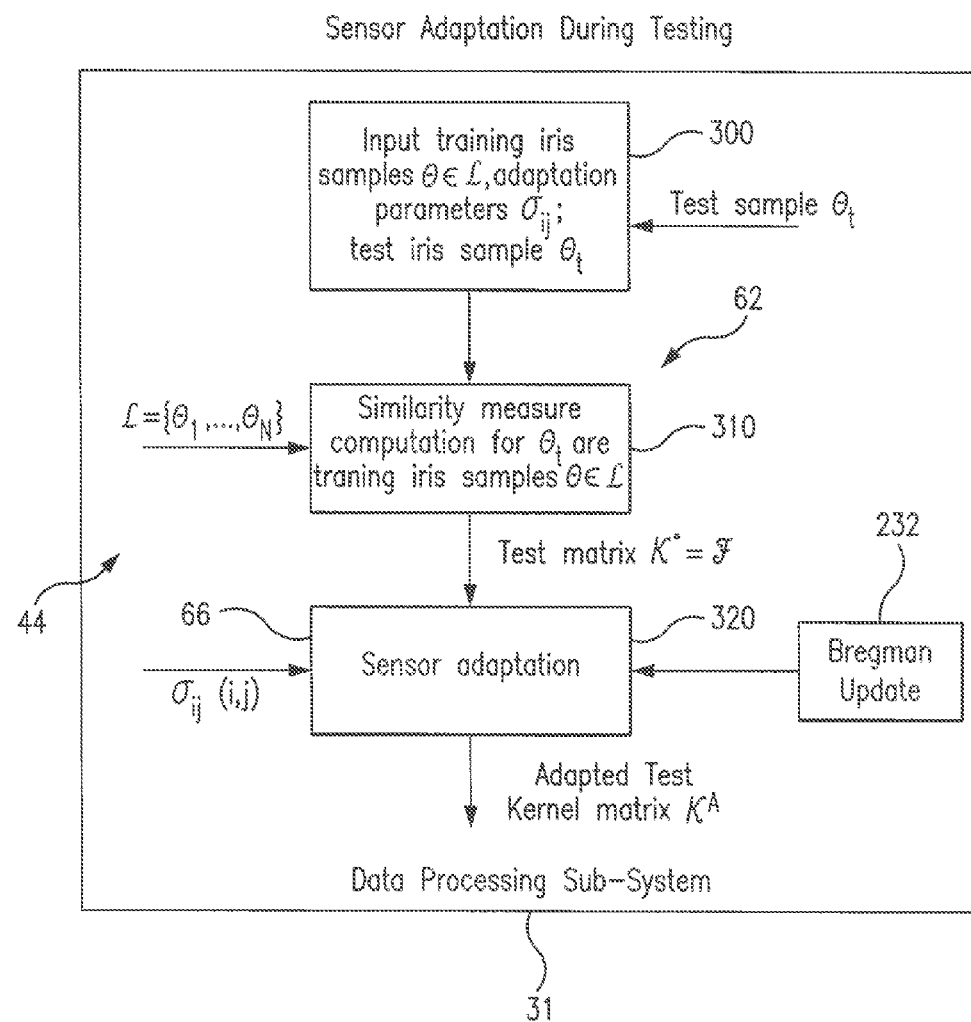
FIG. 6 is a flow chart diagram representing the algorithm for kernel adaptation during testing.

Referring to FIG. 6 which represents in detail the sensor adaptation routine 44 during the testing stage, the procedure starts at Step 300, where the test iris sample $\theta_t$ and the plurality of training iris samples are input for further processing in the Step 310 where the similarity measure is computed in accordance with Eq. 14 for the test sample and all the training samples, and the test initial matrix is calculated. Upon calculation of the test matrix, the logic flows to Step 320, where the sensor adaptation is performed, i.e., the adapted test kernel matrix is computed based on the test initial matrix and the adaptation parameters received from the training stage in accordance with Eq. 51. Again, the Bergman update routine 232 is applied to the process of the sensor adaptation to optimize the process in accordance with Eq. 47, as detailed in FIG. 7.

The data corresponding to the adapted test kernel matrix is further input in the matching sub-system 70 (shown in FIGS. 3-4) for the distance measure computation in accordance with Eq. 52, and subsequent authentication decision making.

Extensions for Practical (Non-Ideal) Systems

Often, practical iris recognition systems need to incorporate additional capabilities like compensation for in-plane rotation of the eye and privacy using cancelable iris patterns. The subject system 30 can be easily extended for these scenarios. Observe from Eqs. 50 and 51 that the proposed technique requires only a similarity function $\mathcal{F}$, which satisfies Eq. 16. To apply the proposed sensor adaptation technique, similarity functions satisfying relevant constraints for these scenarios need to be developed.

Incorporating In-plane Rotation of Eyes

In-plane rotation routine 400 in test iris samples is handled during matching by rotating one of the iris templates by different possible values, computing the normalized Hamming distance for different rotations and computing the effective matching distance between the two templates as the minimum of these distances. In other words, given the set of possible rotations $\mathcal{R}$ and the two iris templates $\theta_1$ and $\theta_2$, the effective matching distance is computed as $$\mathcal{H}_r(\theta_1,\theta_2)=\min_{r\in\mathcal{R}} \mathcal{H}(\theta_1,r(\theta_2)) \quad \text{(Eq. 53)}$$

where the function $r(\cdot)$ represents a rotation of the iris image by a fixed angle. The corresponding similarity function can be derived as $$\mathcal{F}_r(\theta_1,\theta_2)=\max_{r\in\mathcal{R}} \mathcal{F}(\theta_1,r(\theta_2)). \quad \text{(Eq. 54)}$$

Incorporating Privacy of Iris Patterns

An important aspect of iris biometrics is the privacy and protection of iris patterns of the users. For this purpose cancelable iris biometrics routine 410 is introduced in the subject system 30 using sectored Random Projections (J. Pillai, et al., "Sectored random projections for cancelable iris biometrics," in *International Conference on Acoustics, Speech and Signal Processing*, pp. 1838-1841, 2010). In accordance with this technique, each iris image is divided into different sectors and Gabor features are extracted from each of the sectors. Random Projections are then applied to the feature vectors of each sector and concatenated to form the transformed feature vector. Iris codes are extracted from this feature vector, and the normalized Hamming distance is used for matching. Cancelable iris codes for enrollment iris images are stored in a database (optionally, in the database 32) and are matched with cancelable codes obtained from the test iris image. Since the cancelable iris codes are also valid iris codes, the same similarity measure $\mathcal{F}$, supra, can be used, and sensor adaptation can be performed as explained in the previous paragraphs.

Non-binary Feature Representation

For real-valued features, a popular distance measure for iris recognition is the Euclidean distance. For two features $\theta_i$, $\theta_j \in \mathbb{R}^D$, the squared Euclidean distance is given by $$\zeta_e(\theta_i,\theta_j)=\|\theta_i-\theta_j\|^2=\theta_i^T\theta_i+\theta_j^T\theta_j-2\theta_i^T\theta_j, \quad \text{(Eq. 55)}$$

Hence, a similarity function satisfying Eq. 16 is the inner product function $$\mathcal{F}(\theta_i,\theta_j)=\theta_i^T\theta_j. \quad \text{(Eq. 56)}$$

Experiments

The proposed technique for sensor adaptation on data from two sensors, namely LG2200 and LG4000, has been evaluated. These sensors were chosen in the experiments, since they form a real case where an older iris sensor (LG2200) was upgraded to a newer one (LG4000).

The performance of the proposed sensor adaptation was evaluated for the cross-sensor matching. Robustness of the algorithm to variations in parameters was also studied. Furthermore, cross-sensor matching was performed using the subject technique in the presence of in-plane rotations, cancelable iris patterns and non-binary features. Finally, the similarity matrix $\mathcal{F}$ was empirically verified to be positive semi-definite, ensuring that logDet divergence is a good distance measure between the kernel matrix $\mathcal{K}$ and the similarity measure $\mathcal{F}$.

Iris Dataset

The iris dataset used in the experiments was a subset of the BTAS 2012 Cross-sensor Iris Competition dataset, collected at the University of Notre Dame (A. Sgroi, et al, "Cross sensor iris recognition competition," in *IEEE International Conference on Biometrics: Theory, Application and Systems*, 2012). This database has iris images acquired with two sensors, namely LG2200 and LG4000. The LG2200 system has near-IR LEDs at the top, lower left, and lower right, and captures one iris at a time. The LG4000 system has near-IR LEDs on the left and right, and can image both irises of a person at the same time. The initial images taken from both sensors were of size 640 by 480 pixels. However, for the LG2200 sensor, the original images have been stretched vertically by 5% to compensate for the non-unit aspect ratio in the LG2200 acquisition system. Hence, the images from the LG2200 sensor were of size 640 by 504 pixels.

Both the left and right iris images of 123 users were used in the experiments, thereby forming 246 unique iris signatures. For the sensor LG2200, 5 images per eye were used from the same session, forming a total of 246 unique iris patterns and 1230 iris images.

For the sensor LG4000, two different subsets were used. The first subset was collected in the same session as the images acquired with LG2200, and consisted of 246 unique irises with 3 images per eye. The second subset contained 186 unique irises and 3 images per iris. They were acquired between a month and a year after those in the LG2200 subset. The dataset used in the evaluation is summarized in Table 1.

TABLE 1

Number of images in the dataset

| Sensor | Unique Irises | Images/Iris | Total Images |
|---|---|---|---|
| LG2200 | 246 | 5 | 1230 |
| LG4000 same sess. | 246 | 3 | 738 |
| LG4000 diff. sess. | 186 | 3 | 558 |

Implementation Details
Segmentation and Feature Extraction

Iris images segmentation and feature extraction were performed using the Video-based Automated System of Iris Recognition (VASIR) described in Y. Lee, et al., "Improvements in video-based automated system for iris recognition (VASIR)," in Workshop on Motion and Video Computing, pp. 1-8, 2009.

Iris image segmentation and feature extraction were performed using a modified version of the publicly available code of L. Masek, et al., "Matlab source code for a biometric identification system based on iris patterns," *The School of Computer Science and Software Engineering, The University of Western Australia*, 2003. Unlike the Masek's method, the pupil circle was first computed by image binarization, followed by Hough transform. The Hough transform was further applied to find the outer sclera circle. The circular crown thus obtained was resampled using a polar structure and mapped to a 240×20 rectangular grid. Features were then extracted by convolving it with a 2D Gabor filter. 9600-bit iris code was constructed by binarizing the real and imaginary components of the Gabor features. Furthermore, a 9600-bit binary matrix was obtained to mask the pixels corresponding to eyelids and eyelashes.

Evaluation Details

In the experiments, the iris samples from LG2200 formed the gallery, and images from LG4000 were used for testing. Five users were assumed to be enrolled using both the sensors during training, and were excluded from testing. This number of common users was very small. Most of the users were acquired during enrollment and testing using different sensors. Since there are no prior solutions for sensor adaptation in the literature, the results were compared with the cross-matching performance without adaptation. In all the evaluations, five random splits of the training and test data were used. Furthermore, it is referred to "same-session" matching as the cross-sensor matching between the LG2200 samples and LG4000 samples collected in the same session. Similarly, "different-session" matching corresponds to cross-sensor matching using LG2200 samples and LG4000 samples acquired from other sessions.

Sensor Adaptation

Training

During training, once the iris codes of the images in the dataset were extracted, the adaptation parameters were computed from the training data using the Algorithm presented in FIG. 5. At first, the similarity matrix $\mathcal{F}(\theta_i,\theta_j)$ was built from all the training data using (Eq. 14), and the initial kernel matrix $K^0$ was obtained $K^0=\mathcal{F}(\theta_i,\theta_j)$. The intra-sensor and inter-sensor constraints (Eqs. 28-31, 35-36) were then imposed, as explained supra. The final kernel matrix $K^A$ was obtained using (Eqs. 47-48). Using the initial $K^0$ and final kernel matrix $K^A$, the adaptation parameters $\delta_{ij}$ were obtained using (Eqs. 48-50).

Constraints

Intra-sensor constraints were formed using all the LG2200 training samples. Inter-sensor constraints were enforced using the five unique irises acquired with both the sensors. All the same-class constraints were used, and randomly chosen different-class constraints up to three times the number of same-class constraints.

Parameters

The distance threshold $d_u$ was chosen in the range of $10^{th}$-$20^{th}$ percentile of the same-class distances of the LG2200 samples. $d_l$ was chosen in the range of $85^{th}$-$90^{th}$ percentile of the different-class distances between the LG2200 samples. The parameter $\delta$ in the Algorithm presented in FIG. 7 was chosen as 0.1 in all experiments. The performance of the sensor adaptation algorithm was evaluated to variations in these parameters presented infra.

Testing

Testing was performed using the Algorithm shown in FIG. 6. For the test samples, the adapted kernel matrix $K^A$ was obtained using (Eq. 51), and the squared Euclidean distance in the transformed space was computed using (Eq. 52). Verification was performed using this distance.

Cross-sensor Adaptation

Figure 8A:
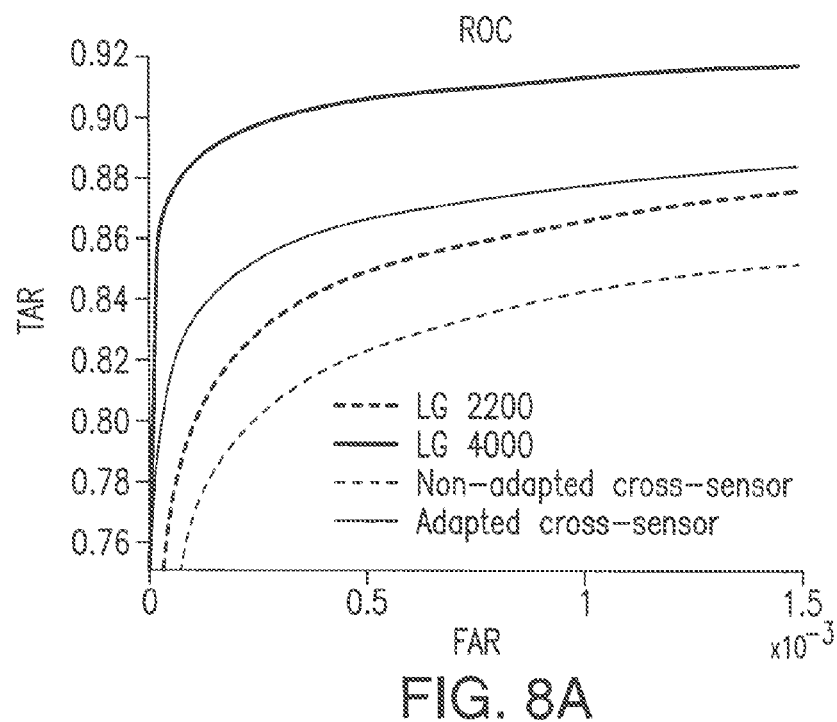
FIGS. 8A and 8B are diagrams representative of the ROC curve for the adapted and non-adapted cases (FIG. 8A), and the Hamming distance distribution for the genuine and imposter matching before and after adaptation (FIG. 8B)

The cross-sensor matching performance was analyzed before and after sensor adaptation. The ROC (Receiver Operating Characteristics) curves corresponding to same-session and different-session matching for the non-adapted and adapted cases are shown in FIG. 8A.

In Table 2, the results are presented in the form of the Equal Error Rate (EER) and the True Verification Rate (TAR), at a False Rejection Rate (FRR) of 0.1%.

TABLE 2

Cross sensor matching results before and after adaptation for the same session and different session cases.

| | TAR (%) at FRR = 0.1% | | | | EER (%) | | | |
| | | | Cross Sensor | | | | Cross Sensor | |
| Session | LG2200 | LG4000 | Non Adapted | Adapted | LG2200 | LG4000 | Non Adapted | Adapted |
| --- | --- | --- | --- | --- | --- | --- | --- | --- |
| Same | 97.8 | 99.52 | 94.13 | 95.73 | 1.46 | 0.36 | 2.85 | 2.26 |
| Diff. | 93.53 | 97.61 | 91.93 | 93.78 | 3.04 | 1.32 | 3.56 | 2.87 |

After adaptation, the TAR improves by 2.6% for the same-session matching, and by 3.2% for the different-session matching. Furthermore, the EER improves by 1.4% and 1.7% for the same-session and different-session cases, respectively. These results clearly demonstrate the performance improvement achieved by the proposed method.

Figure 8B:
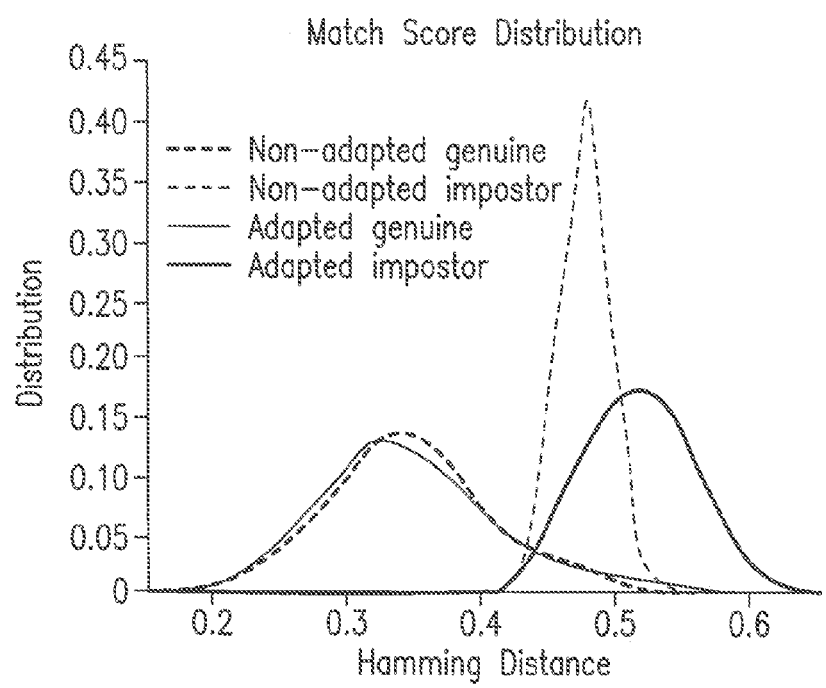

The Hamming distance distributions for the adapted and non-adapted cases are illustrated in FIG. 8B. As can be observed, the adaptation shifts the genuine and impostor distributions apart, leading to a better discrimination between the genuine and impostor pairs.

The performance improvement was attributed to the intra-sensor and inter-sensor constraints imposed by the subject algorithm underlying the operation of the present iris recognition system. The intra-sensor constraints are believed to reduce the intra-class variations between samples, and increase the inter-class variations in the transformed space, leading to better accuracy in the verification.

The inter-sensor constraints brought the testing samples acquired with the LG4000 sensor closer to the same class samples acquired with the LG2200 sensor in the transformed space, thereby improving the cross-sensor matching.

While these constraints are imposed using a small number of LG4000 samples, the adaptation algorithm generalizes to unseen test samples, leading to accurate verification. It is believed that the reason for high improvement achieved with the sensor adaptation method even with a very low number of cross-sensor training classes is that the same-sensor constraints have a greater power to bring all of the same class images close and different class images farther away. The adaptation was performed using a higher number of cross-sensor training classes with no significant improvement. The great advantage of this is that only a few users have to be enrolled in both sensors in order to learn the adaptation parameters.

It was observed in the experiments that intra-sensor constraints played a dominant role in performance improvement compared to the inter-sensor constraints. Inter-sensor constraints enforced using a small number of common users in both sensors were sufficient to improve the cross-sensor matching performance. This is a very desirable property, since the need for re-enrollment is significantly reduced through the subject algorithm.

Cross-sensor Recognition on a Well Segmented Subset of ND Dataset

It was observed that the VASIR results had segmentation errors, which reduced the same sensor recognition results of the LG2200 and LG400 sensors. In this section, the cross-sensor recognition performance on a subset of the ND dataset is evaluated, which is manually verified to be free of segmentation errors. Hence, this experiment analyzes the behavior of the algorithm on well segmented iris data, avoiding biases due to segmentation errors. This smaller dataset consists of the left and right iris images of 123 users, thereby forming 246 unique iris signatures. For sensor LG2200, 5 images per eye were used from the same session. For sensor LG4000, two different subsets were used. The first subset was collected in the same session as the images acquired with LG2200, and consists of 246 unique irises with 3 images per eye. The second subset contained 186 unique irises and 3 images per iris. They were acquired between a month and a year after those in the LG2200 subset.

Figure 10A:
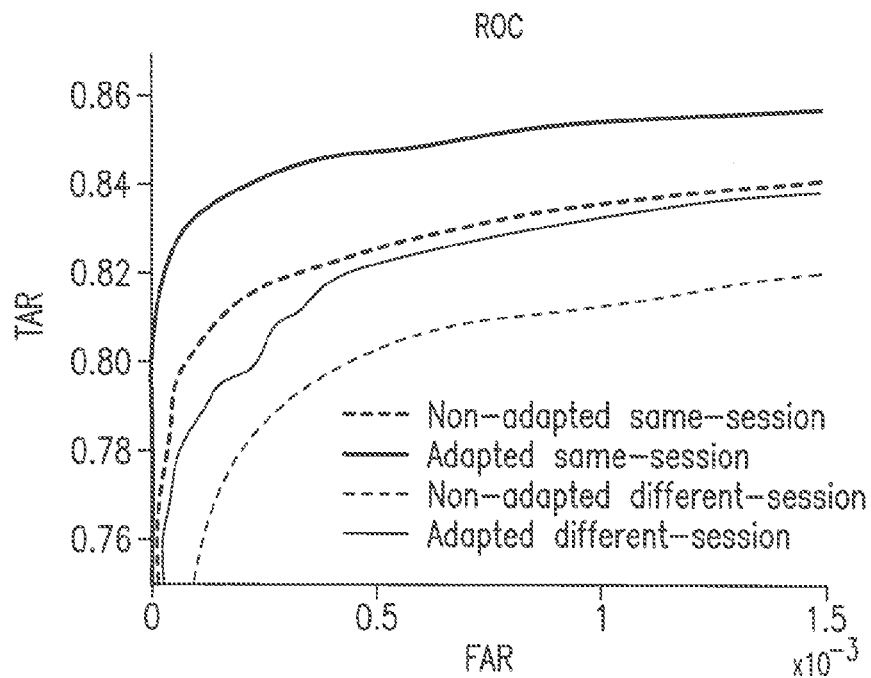
FIGS. 10A, 10B and 10C are diagrams representative of the ROC curve for the adapted and non-adapted situations on the subset of ND dataset (FIG. 10A), the Hamming distance distribution for the genuine and imposter matching before and after adaptation of the subset of ND dataset (FIG. 10B), and adaptation performance using real-valued features (FIG. 10C)
Figure 10B:
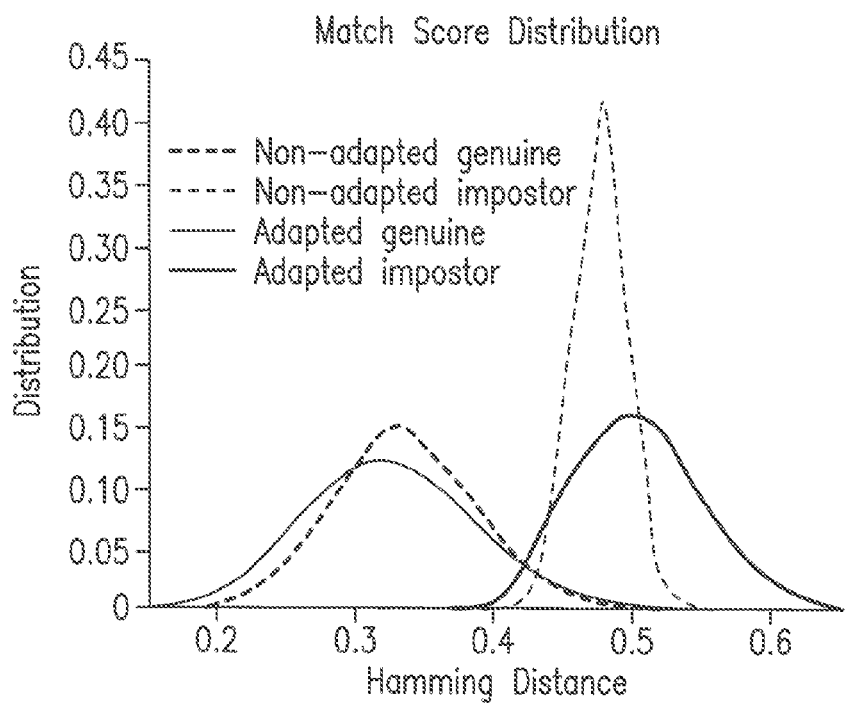

The ROC curves corresponding to same-session and different-session matching for the non-adapted and adapted cases are shown in FIG. 10A. In Table 2, the results are presented in the form of the Equal Error Rate (EER) and the True Verification Rate (TAR), at a False Rejection Rate (FRR) of 0.1%. The same sensor performance is better on this subset, since it does not have segmentation errors. As before, it was observed that sensor adaptation improves the cross-sensor recognition performance. After adaptation, the TAR improves by 1.6% for the same-session matching, and by 1.85% for the different-session matching. For the case of matching across sessions, the cross-sensor accuracy is even better than the same sensor LG2200 accuracy. Moreover, the Hamming distance distributions in FIG. 10B illustrate that adaptation moves the genuine and impostor distributions apart, leading to better discrimination between the genuine and impostor pairs.

Robustness to Parameters

Figure 9A:
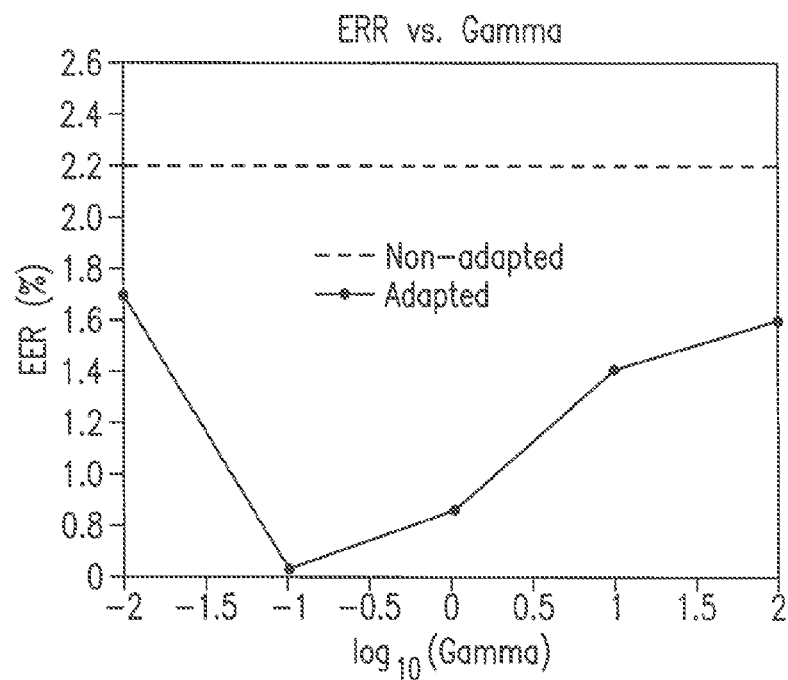
FIGS. 9A and 9B are diagrams representative of variation of verification accuracy during testing with the parameter Gamma (FIG. 9A), and the number of iteration cycles in the learning algorithm (FIG. 9B)

The parameters of the subject algorithm include the parameter $\gamma$ in the Algorithm shown in FIG. 7, the number of iterations $\tau$ of the Bregman update, and the distance threshold $d_u$ and $d_l$. The robustness of the sensor adaptation algorithm to variations in these parameters has been analyzed. The EER (Equal Error Rate) corresponding to different values of the parameter $\gamma$ is presented in FIG. 9A. While the best performance is obtained using $\gamma=0.1$, the subject algorithm improves the equal error rate for a wide range of $\gamma$, illustrating its robustness to the parameter.

Figure 9B:
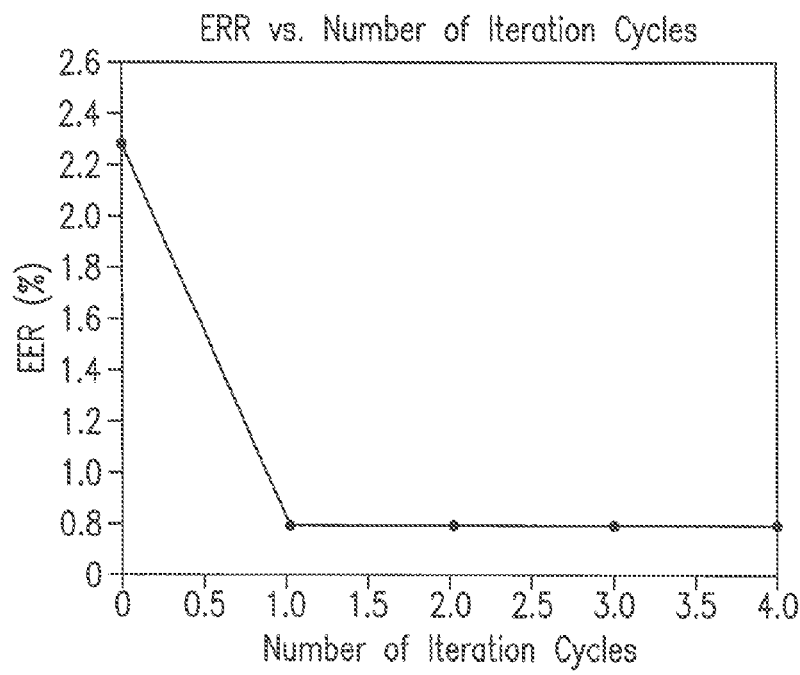

Performing Bregman projections over all the constraints once is referred to as an "iteration cycle". FIG. 9B shows the variation in EER for different number of iteration cycles in the training stage of the subject system operation. As seen in FIG. 9B, the subject algorithm converges quickly after all the constraints have been visited once, and further update does not change the performance. Furthermore, little variation in cross-sensor matching performance was observed with significant variations in the distance thresholds $d_u$ and $d_l$.

Incorporating In-plane Rotation

Figure 11A:
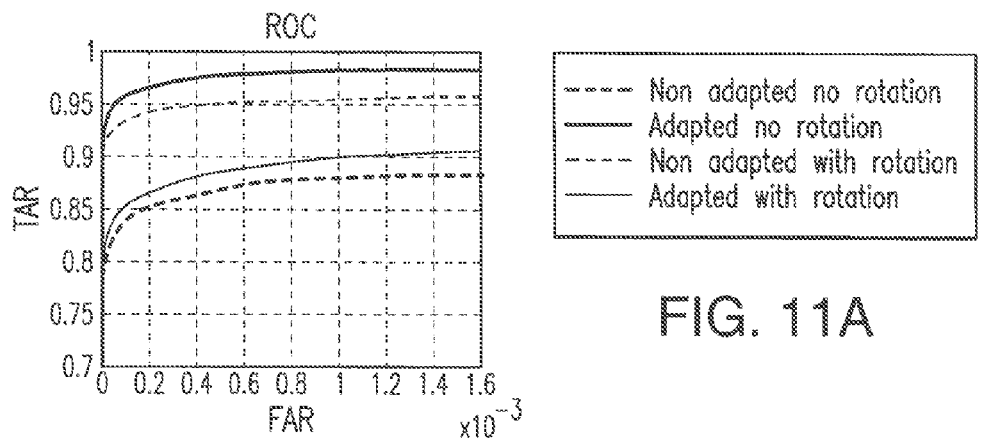
FIGS. 11A, 11B and 11C are diagrams representative of the adaptation performance with and without the mask (FIG. 11A), adaptation performance with and without rotation (FIG. 11B), and adaptation performance using cancelable binary features for the same and different session comparisons (FIG. 11C)

The extension to the sensor adaptation algorithm to handle in-plane rotations was evaluated. In FIG. 11A, the ROC curves for cross-sensor matching with and without the rotation feature are presented. For the non-adapted case, "no rotation" curve corresponds to directly using the normalized Hamming distance. In the "non-adapted rotation" case, seven different rotations of the iris samples were considered and the minimum of the normalized Hamming distance was used for verification. As expected, handling rotation improves the verification accuracy in the non-adapted case. Furthermore, the rotation extension of the sensor adaptation algorithm improves verification accuracy significantly compared to the non-adapted ones. Table 3 shows the EER and TAR results for this experiment.

TABLE 3

Results for the cross sensor matching using rotation before and after adaptation

| | TAR (%) at FRR = 0.1% | | EER (%) | |
|---|---|---|---|---|
| Rotation | Non Adapted | Adapted | Non adapted | Adapted |
| No | 88.0 | 90.1 | 5.5 | 3.7 |
| Yes | 95.5 | 98.2 | 2.2 | 0.8 |

Incorporating Occlusion Mask

Figure 11B:
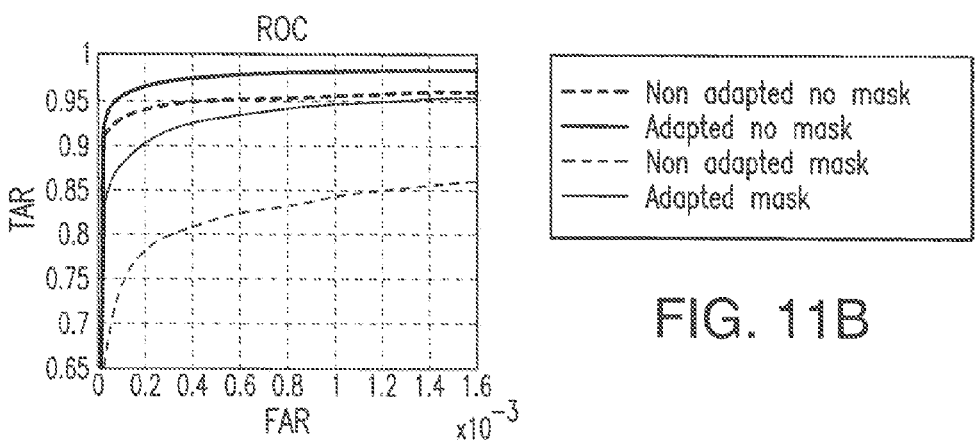

Iris images often contain occlusions due to eyelids and eyelashes, leading to lower verification accuracy. In FIG. 11B, the ROC curves for the cross-sensor matching with and without occlusion masks are presented. As in the case of rotation, adding the occlusion masks leads to a better verification performance before and after adaptation. These results are summarized in Table 4.

TABLE 4

Results for the cross sensor matching using mask before and after adaptation

| | TAR (%) at FRR = 0.1% | | EER (%) | |
|---|---|---|---|---|
| Mask | Non Adapted | Adapted | Non adapted | Adapted |
| No | 83.9 | 94.5 | 3.6 | 1.4 |
| Yes | 95.5 | 98.2 | 2.2 | 0.8 |

Even though the sensor adaptation performance is better when the mask is used, the performance improves dramatically after adaptation in the no-mask case. It can be seen that the TAR improves from 83.9% to 94.5% at an FRR of 0.1% using sensor adaptation in the no-mask case.

Incorporating Cancelability

The subject iris recognition system is designed with the feature of incorporating cancelable patterns for privacy. With this feature, the enrolled iris samples are stored in the database in the form of their cancelable patterns. Hence, it is essential to perform sensor adaptation on cancelable patterns. The performance of the sensor-adaptation algorithm on cancelable patterns was evaluated.

The method described in J. Pillai, et al., "Sectored random projections for cancelable iris biometrics," in *International Conference on Acoustics, Speech and Signal Processing*, pp. 1838-1841, 2010, was used to obtain the cancelable patterns.

Figure 11C:
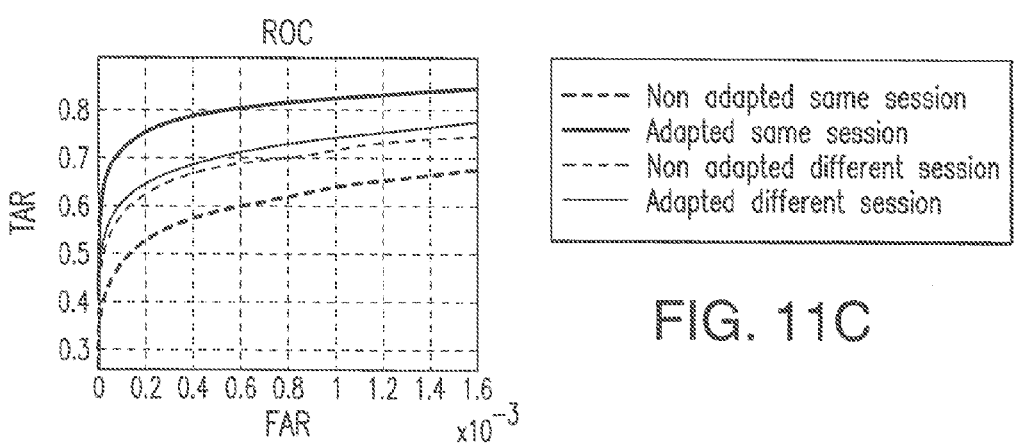

Sensor adaptation was performed as described supra. In FIG. 11C, the ROC curve for the adapted and non-adapted cases are plotted. Verification accuracies with cancelable patterns were observed to be lower than those without them. However, the adaptation algorithm still improves the cross-sensor matching performance in both the same-session and different-session cases. The summary of the results appear in Table 5. The TAR at FRR of 0.1% is improved by 10% in both the same and different session cases.

TABLE 5

Results for the cross sensor matching using cancelable features before and after adaptation

| | TAR (%) at FRR = 0.1% | | EER (%) | |
|---|---|---|---|---|
| Session | Non Adapted | Adapted | Non adapted | Adapted |
| Same | 71.5 | 81.9 | 7.9 | 4.9 |
| Diff. | 63.7 | 73.9 | 11.5 | 7.2 |

Incorporating Non-binary Features

Figure 10C:
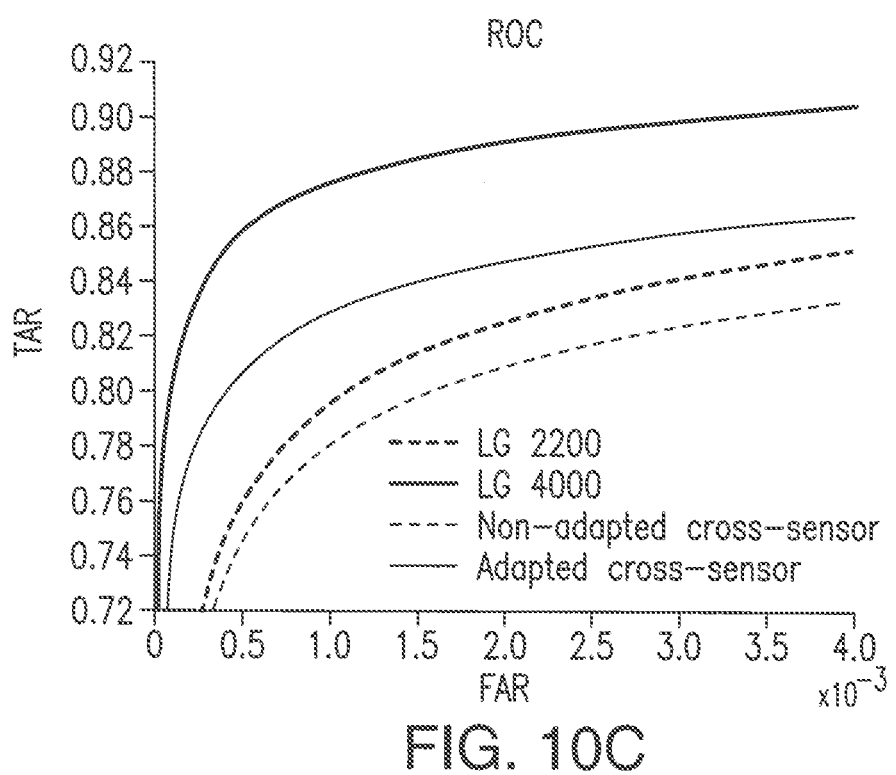

For the sensor adaptation based on real-valued features, the phase of the Gabor features was selected as the non-binary feature. However, the subject algorithm can be also applied to other types of real-valued features. After performing iris segmentation and unwrapping, the Gabor filter was applied and the phase of the filter output at each pixel was computed. The kernel computation was performed using the linear kernel function detailed supra. The matching score corresponds to the squared Euclidean distance between the transformed features. The ROC curves are presented in FIG. 10C, and a summary of the experimentation results appear in Table 6. As can be observed, adaptation improves the cross-sensor matching, even though the Euclidean distance is not the best measure of similarity between phase features.

TABLE 6

Results for the cross sensor matching using the phase of the Gabor features before and after adaptation

| | TAR (%) at FRR = 0.1% | | ERR (%) | |
|---|---|---|---|---|
| Session | Non adapted | Adapted | Non adapted | Adapted |
| Same | 80.9 | 83.9 | 7.1 | 5.1 |
| Diff. | 75.5 | 78.9 | 9.8 | 7.0 |

Effect of Intra-sensor and Inter-sensor Constraints

Figure 12A:
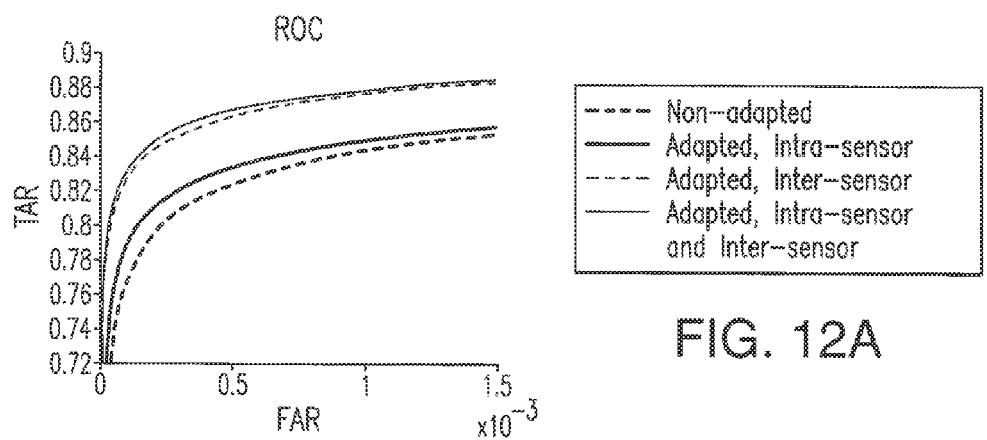
FIGS. 12A, 12B and 12C are diagrams representative of results of intra-sensor and inter-sensor constraints (FIG. 12A), effect of session variations on cross-sensor recognition (FIG. 12B), and effect of training size on cross-sensor recognition (FIG. 12C)

The relative importance of intra-sensor and inter-sensor constraints on the entire ND dataset was evaluated. The ROC curves for cross-sensor recognition are presented in FIG. 12A. Equal Error Rate (EER) and the True Verification Rate (TAR), at a False Rejection Rate (FRR) of 0.1% are provided in Table 7. The results demonstrate that inter-sensor constraints contribute significantly to performance improvement. This is expected, as inter-sensor constraints are responsible for reducing the variations between the sensors. Furthermore, combining the inter-sensor and intra-sensor constraints gave the highest accuracy.

TABLE 7

Effect of intra-sensor and inter-sensor constraints on cross-sensor recognition

| TAR (%) at FRR = 0.1% | | | | ERR (%) | | | |
|---|---|---|---|---|---|---|---|
| | Adapted using constraints | | | | Adapted using constraints | | |
| Non-adapted | Intra-sensor | Inter-sensor | Both | Non-adapted | Intra-sensor | Inter-sensor | Both |
| 84.34 | 84.90 | 87.73 | 87.82 | 7.19 | 7.19 | 6.14 | 6.09 |

Effect of Session Variations

Figure 12B:
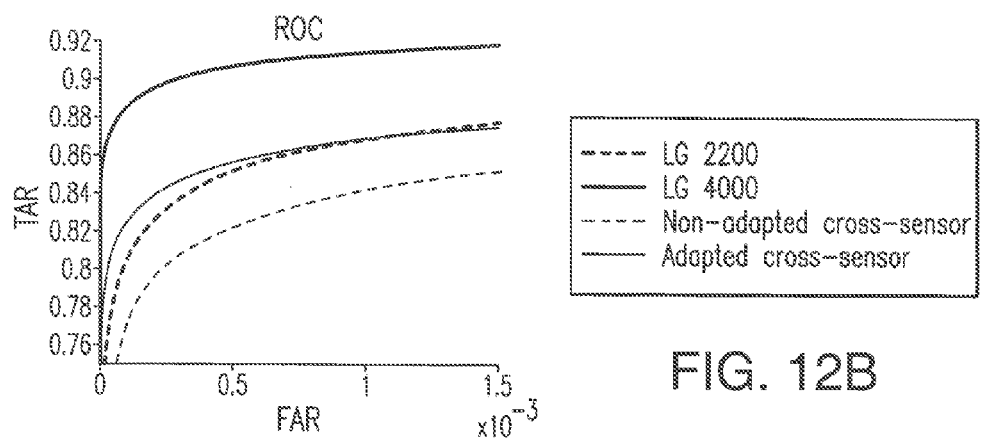

If the training data from different sensors are collected in different sessions, it is possible that the proposed method will learn the session variations, along with the sensor variations. To evaluate the effect of these session variations, training data for each sensor from a different session were used. Then the cross-sensor performance on new sessions unseen during training was evaluated. The ROC curves are shown in FIG. 12B. As expected, when the training data for each sensor is chosen from a different session, the true acceptance rate after adaptation is reduced from 87.82% to 86.87%. This accuracy is better than that of the LG2000 same sensor recognition accuracy of 86.81% and the non-adapted cross sensor accuracy of 84.27%. This experiment demonstrates that the proposed method generalizes across unseen sessions.

Number of Subjects During Training

Figure 12C:
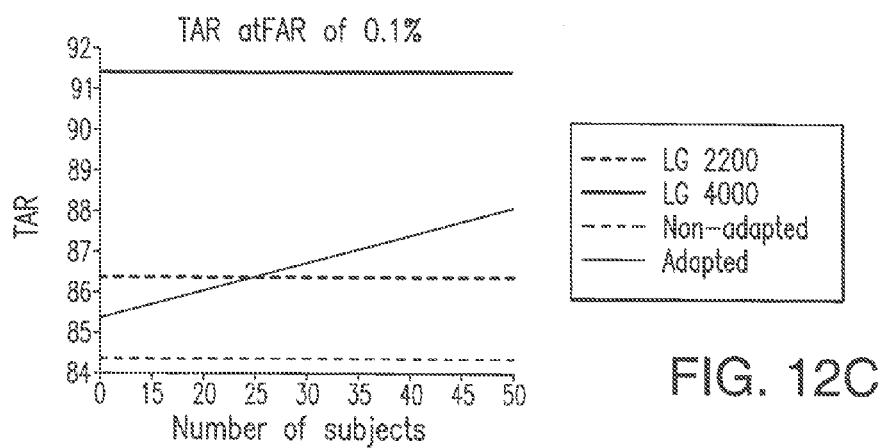

The effect of the size of training data on cross-sensor recognition accuracy, was analyzed. The True Acceptance Rate (TAR) at a False Acceptance Rate (FAR) of 0.1% with varying number of subjects for training is presented in FIG. 12C. Observe that even with ten subjects, the cross-sensor recognition accuracy after adaptation is better than that of the non-adapted case. Furthermore, the cross-sensor recognition accuracy improves with more training data. This is expected as more constraints are available for learning as training data increases.

Empirical Verification of Positive Semi-definiteness of the Similarity Measure

To use the logDet divergence, the similarity matrix $\mathcal{F}$ should be positive semi-definite. To verify this empirically, it is to be checked whether the eigen values of the similarity matrix are non-negative. However, eigen value computation of large matrices is often imprecise due to numerical errors. Hence, the Principal Minor Test, J. E. Prussing, "The principal minor test for semi-definite matrices," *Journal of Guidance, Control, and Dynamics*, Vol. 9, No. 1, pp. 121-122, 1986 was adopted.

By definition, the $k^{th}$ principal minors of a matrix are the determinants of the submatrices formed by deleting any n−k rows and the corresponding columns of that matrix. By the Principal Minor Test, a necessary and sufficient condition for a matrix to be positive semi-definite is that all possible principal minors of the matrix are non-negative.

Using 1,622 iris samples acquired in both LG2200 and LG4000 sensors, the similarity matrix corresponding to the fixed mask, as well varying mask due to occlusion and the rotation cases were constructed. For a given matrix with n rows and a particular submatrix dimension k, there are $$\binom{n}{r}$$

principal minors, which increases exponentially with n.

Figure 13A:
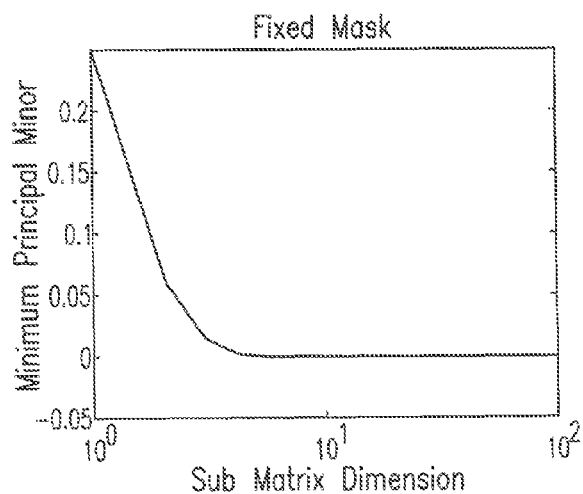
FIGS. 13A, 13B and 13C are diagrams representative of the minimum principal minor for each submatrix dimension of the similarity matrix for the fixed mask (FIG. 13A), occlusion (FIG. 13B), and rotation cases (FIG. 13C).
Figure 13B:
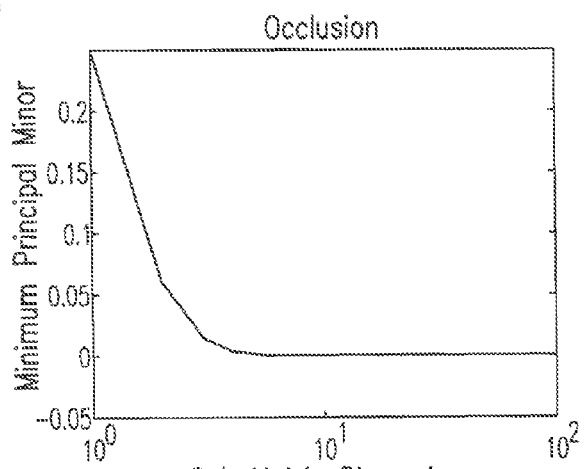
Figure 13C:
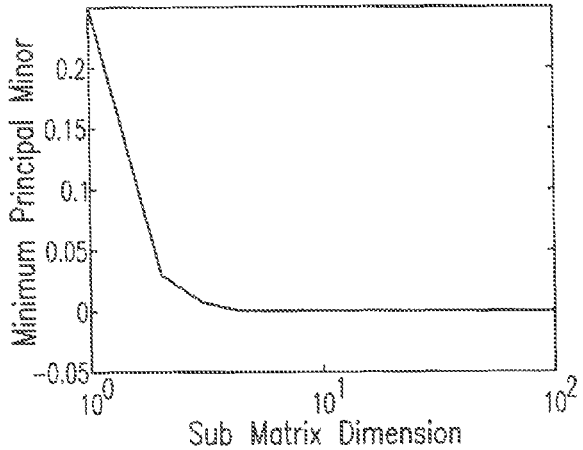

Given the large number of possible minors, for each submatrix dimension, a fixed number of principal minors was chosen (as 100 in the experiments) and their determinant was computed. The minimum of the randomly chosen minors was plotted in FIGS. 13A, 13B, 13C. The initial 100 dimensions (from 1,622 submatrix dimensions) are shown in FIGS. 13A-13C for clarity. The minimum of the chosen minors were non-negative for each submatrix dimension, indicating that all the chosen minors are non-negative. This empirically verifies that the similarity matrix $\mathcal{F}$ is positive semi-definite.

Hardware and Computational Complexity

In the subject sensor adaptation method, the squared Euclidean distance between each test sample and the enrolled samples in the transformed space during testing are to be found. The additional steps introduced are the computation of the initial kernel using (Eq. 16), the adaptation of the kernel using (Eq. 48), and the calculation of the adapted Hamming distance using (Eq. 52). However, these three steps are simple linear operations, and introduce limited overhead to the original iris recognition system. Furthermore, the only additional components required in the system are adders and multipliers, and can easily be incorporated into existing systems.

Comparison of the Testing Time for the Non-adapted and Adapted Cases.

The testing time for the non-adapted and adapted cases was compared using MATLAB R2011a on an Intel Dual Core 2.33 GHz processor. In the non-adapted case, for each LG4000 sample, the time was recorded for iris image segmentation, feature extraction, and matching with all the samples in the LG2200 dataset. In the adapted case, along with the segmentation and feature extraction times, the time for computing the squared Euclidean distance in the transformed domain and matching with the LG2200 samples were included. The experiment was run 10 times and the average testing times are presented in Table 8. As can be observed, the sensor adaptation algorithm leads to a small increase in the execution time.

TABLE 8

Comparison of the testing time for the non-adapted and adapted cases.

| | Non-Adapted | Adapted |
|---|---|---|
| Time(s) | 25.5 | 27.9 |

The sensor mismatch problem in iris recognition was analyzed, where the enrolled samples and the testing samples are acquired using different sensors. An efficient algorithm was developed to mitigate the cross-sensor performance drop. The proposed method is believed to be the first comprehensive solution to this problem. Evaluation on iris data from multiple sensors clearly demonstrate the performance improvement achieved by the subject system and method, even with only five users re-enrolled using the new sensor. Hence, the need for re-enrollment is considerably reduced, when a new sensor is deployed.

The sensor adaptation algorithm has been extended to handle in-plane rotations, cancelable patterns, and non-binary feature representations. The subject kernel-learning framework is envisioned for being utilized for developing future kernel-based algorithms for iris biometrics, including kernel dimensionality reduction and max-margin classifiers for iris biometrics using the proposed framework, similar sensor adaptation algorithms for other biometric signatures like fingerprints, and multi-biometric systems.

Although this invention has been described in connection with specific forms and embodiments thereof, it will be appreciated that various modifications other than those discussed above may be resorted to without departing from the spirit or scope of the invention as defined in the appended claims. For example, functionally equivalent elements may be substituted for those specifically shown and described, certain features may be used independently of other features, and in certain cases, particular locations of the elements may be reversed or interposed, all without departing from the spirit or scope of the invention as defined in the appended claims.

What is being claimed is:

1. A method for iris recognition, comprising the steps of:
establishing a data processing sub-system in an iris recognition system configured to perform iris recognition through the steps of:
performing a training stage of operation in said iris recognition system, including the steps of:
(a) acquiring a plurality of training iris samples $\mathcal{L} = \{\theta_1, \theta_2, \ldots, \theta_N\}$ with a plurality of different sensors $\{S_1, S_2, \ldots, S_{Ns}\}$ for a plurality of subjects $\{y_1, y_2, \ldots y_{Nc}\}$,
(b) for each pair $\theta_i, \theta_j$ of training iris samples from said plurality $\mathcal{L}$ thereof, computing, by said data processing sub-system of said iris recognition system, a similarity measure $\mathcal{F}(\theta_i, \theta_j)$ between said training iris samples $\theta_i$ and $\theta_j$, where $\theta_i, \theta_j \in \mathcal{L}$,
(c) forming, by said data processing sub-system, an initial training kernel matrix $K^0 = \mathcal{F}(\theta_i, \theta_j)$ for said plurality of training iris samples,
(d) iteratively updating, by said data processing sub-system, said initial training kernel matrix $K^0$ by applying Bregman projections at each iteration, thereby forming a final training kernel matrix $K^A(\theta_i, \theta_j)$, and thereby establishing a space of allowable transformations for said training iris samples $\theta_i, \theta_j$ satisfying predetermined constraints $C\{\theta_i, \theta_j\}$ imposed between said training iris samples $\theta_i$ and $\theta_j$,
(e) extracting adaptation parameters $\sigma_{ij}$ through processing said initial and final training kernel matrices by said data processing sub-system;
performing a testing stage of operation subsequently to said training stage of operation through the steps of:
(f) acquiring a test iris sample $\theta_t$,
(g) computing, by said data processing sub-system, said similarity measure $\mathcal{F}(\theta_t, \theta)$ for said testing iris sample $\theta_t$ and said plurality of the training iris samples $\theta \in \mathcal{L}$,
(h) forming, by said data processing sub-system, an initial test matrix $K^0_{test} = \mathcal{F}(\theta_t, \theta)$,
(i) computing, by said data processing sub-system, a test adapted kernel function $K^A_{test}$ for said test iris sample $\theta_t$ based on said initial test matrix $K^0_{test}$ and said adaptation parameters $\sigma_{ij}$ as $$K^A(\theta_t, \theta) = \mathcal{F}(\theta_t, \theta) + \sum_{ij} \sigma_{ij} \mathcal{F}(\theta_t, \theta_i) \mathcal{F}(\theta_j, \theta);$$

and
performing a matching routine subsequently to said testing stage of operation through the steps of:
(j) computing, by said data processing sub-system, a distance measure between said test iris sample $\theta_t$ and an enrollment iris sample $\theta_{en}$, and
(k) verifying, by said data processing sub-system, said test iris sample as genuine if said distance measure in said transformed space between said test and enrollment iris samples is smaller than a predetermined threshold.

2. The method of claim 1, wherein in said step (j), said distance measure between said test iris sample and said enrollment iris sample includes the squared Euclidean distance in the transformed space computed as $$\zeta_e(\phi^A(\theta_t), \phi^A(\theta_{en})) = K^A(\theta_t, \theta_t) + K^A(\theta_{en}, \theta_{en}) - 2K^A(\theta_t, \theta_{en}), \forall \theta_{en} \in \mathcal{L};$$

wherein $\zeta_e(\cdot, \cdot)$ is the squared Euclidean distance, and $\phi(\theta_t)$, $\phi(\theta_{en})$ denote transformations applied to said test iris sample $\theta_t$ and enrollment iris sample $\theta_{en}$, respectively.

3. The method of claim 1, wherein said constraints $C\{\theta_i, \theta_j\}$ applied to said transforms include at least one constraint selected from a group including: distance preserving constraints, inter-sensor constraints, and intra-sensor constraints.

4. The method of claim 3, wherein, in accordance with said distance-preserving constraints, distances between each pair of said training iris samples of said plurality thereof is preserved by said learned transformations;
wherein, in accordance with said inter-sensor constraints, $$\zeta_e(\phi(\theta_i), \phi(\theta_j)) \leq d_u, \text{ if } y_i = y_j, s_i \neq s_j$$

$$\zeta_e(\phi(\theta_i), \phi(\theta_j)) \geq d_l, \text{ if } y_i \neq y_j, s_i \neq s_j;$$

wherein $d_u$ is the upper distance threshold, and $d_l$ is the lowest distance threshold, $\zeta_e(\cdot, \cdot)$ is the squared Euclidean distance, and $\phi(\theta_i)$, $\phi(\theta_j)$ denote transformations applied to $\theta_i$ and $\theta_j$, respectively; and
wherein, in accordance with said intra-sensor constraints, $$\zeta_e(\phi(\theta_i), \phi(\theta_j)) \leq d_u, \text{ if } y_i = y_j, s_i = s_j$$

$$\zeta_e(\phi(\theta_i), \phi(\theta_j)) \geq d_l, \text{ if } y_i \neq y_j, s_i = s_j.$$

5. The method of claim 1, wherein in said step (b), said similarity measure $\mathcal{F}(\theta_i, \theta_j)$ between said training samples $\theta_i$ and $\theta_j$ is computed by said data processing sub-system as:

$$\mathcal{F}(\theta_i, \theta_j) = \frac{\eta_A(\theta_i, \theta_j) - \eta_D(\theta_i, \theta_j)}{4\eta(\theta_i, \theta_j)},$$

wherein $\eta_A(\theta_i, \theta_j)$ is the number of valid bits in said training samples $\theta_i$ and $\theta_j$ that agree, $\eta_D(\theta_i, \theta_j)$ is the number of valid bits in said training samples $\theta_i$ and $\theta_j$ that disagree, and $\eta(\theta_i, \theta_j)$ is the number of valid bits in said $\theta_i$ and $\theta_j$ cumulatively.

6. The method of claim 3, wherein in said step (d), at each said iteration $(t+1)^{th}$, the Bregman projection constitutes the Bregman update computed by said data processing sub-system as $$\mathcal{K}^{t+1} = \mathcal{K}^t + \beta_{t+1} \mathcal{K}^t e_{t_i} e_{t_j}^T \mathcal{K}^t$$

where $\iota^0 = \mathcal{F}$, $e_{t_j}^T$ is the transpose of the vector $e_{t_j}$, and scalar $\beta_{t+1}$ is computed at each iteration until convergence of said $\mathcal{K}^0$ during adaptation.

7. The method of claim 6, wherein said final training kernel matrix $\mathcal{K}^A$ is computed as $$\mathcal{K}^A = \mathcal{K}^0 + \sum_{(i,j) \in C} \sigma_{ij} \mathcal{K}^0 e_i e_j^T \mathcal{K}^0$$

wherein said adaption parameters $\sigma_{ij}$ represent the contribution made by the $(i, j)^{th}$ constraint to the final kernel matrix $\mathcal{K}^A$.

8. The method of claim 1, wherein in said step (g), said similarity measure $\mathcal{F}(\theta_t, \theta)$ between said test iris sample and each said training iris sample $\theta$ from said plurality $\mathcal{L}$ thereof is computed as:

$$\frac{\eta_A(\theta_t, \theta) - \eta_D(\theta_t, \theta)}{4\eta(\theta_t, \theta)},$$

wherein $\eta_A(\theta_t, \theta)$ is the number of valid bits in said test sample $\theta_t$ and $\theta$ that agree, $\eta_D(\theta_t, \theta)$ is the number of valid bits in said test sample $\theta_t$ and training samples $\theta$ that disagree, and $\eta(\theta_t, \theta)$ is the number of valid bits in said $\theta_t$ and $\theta$ cumulatively.

9. The method of claim 1, wherein in said step (d), said final training kernel matrix $\mathcal{K}^A$ is a solution of an optimization problem $$\mathcal{K}^A = \arg\min_{\mathcal{K} \in S} \sum_{\theta_i, \theta_j \in \mathcal{L}} \zeta_d(\mathcal{K}_{ii} + \mathcal{K}_{jj} - 2\mathcal{K}_{ij}, \mathcal{H}(\theta_i, \theta_j))$$

subject to the constraints, $\theta_i, \theta_j \in \mathcal{L}$, $$\mathcal{K}_{ii} + \mathcal{K}_{jj} - 2\mathcal{K}_{ij} \geq d_u, \text{ if } y_i = y_j$$

$$\mathcal{K}_{ii} + \mathcal{K}_{jj} - 2\mathcal{K}_{ij} \leq d_l, \text{ if } y_i \neq y_j$$

wherein said $\mathcal{K}^A(\theta_i, \theta_j) = \phi^A(\theta_i)^T \phi^A(\theta_j)$ is the adapted kernel matrix corresponding to the optimal transformation, S is the space of all position semi-definite matrices, and each $\mathcal{K}_{ii}$, $\mathcal{K}_{ij}$, $\mathcal{K}_{jj}$ denotes the kernel matrix whose respective $(i,i)^{th}$, $(i,j)^{th}$, or $(j,j)^{th}$ entry is the kernel function between corresponding samples, wherein $\mathcal{K}_{ii} = \mathcal{K}(\theta_i, \theta_i)$, $\mathcal{K}_{ij} = \mathcal{K}(\theta_i, \theta_j)$, $\mathcal{K}_{jj} = \mathcal{K}(\theta_j, \theta_j)$.

10. The method of claim 1, further comprising the steps of:

prior to said step (j), performing rotation of said test and enrollment iris samples through the steps of:

rotating at least one of said test and enrollment iris samples by a plurality of possible values $\mathcal{R}$, comprising a normalized Hamming distance $\mathcal{H}(\theta_t, \theta_{en})$ for each of said rotations, and computing an effective matching distance between said $\theta_t$ and $\theta_{en}$ as the minimum of said $\mathcal{H}$, $$\mathcal{H}_r(\theta_t, \theta_{en}) = \min_{r \in \mathcal{R}} \mathcal{H}(\theta_t, r(\theta_{en})),$$

where $r(\cdot)$ represents rotation of said at least one iris sample by a fixed angle, and wherein said similarity measure is derived as $$\mathcal{F}_r(\theta_t, \theta_{en}) = \max_{r \in \mathcal{R}} \mathcal{F}(\theta_t, r(\theta_{en})).$$

11. The method of claim 1, further comprising the steps of:

after said steps (a) and (f), dividing each of said training iris samples $\theta$ and said test iris samples $\theta_t$ into a number of sectors, extracting Gabor vector features from each of said sectors, applying Random Projections to said feature vectors of each sector in said plurality thereof, concatenating said Random Projections of said feature vectors, thereby forming a transformed feature vector of said each iris sample, extracting cancelable iris code from said transformed feature vector, storing said cancelable iris code for said enrollment iris sample in an enrollment database, and in said step (j), matching said cancelable iris code of said enrollment iris sample with the cancellable iris code of said test iris sample.

12. A system for iris recognition, comprising:

a data processing sub-system configured to perform computations in the iris recognition system;

an enrollment sub-system operatively coupled to said data processing sub-system, wherein said enrollment sub-system includes at least a first iris sample acquisition sub-system including at least a first sensor acquiring a plurality of enrollment iris samples for a plurality of subjects, and a database storing representations of said enrollment iris samples;

a verification sub-system operatively coupled to said data processing sub-system, wherein said verification sub-system includes at least a second iris sample acquisition sub-system including at least a second sensor acquiring at least one test iris sample for matching with a respective enrollment iris sample from said database; and a sensor adaptation sub-system operatively coupled to said data processing sub-system and operatively interconnected between said enrollment and verification sub-systems, wherein said sensor adaptation sub-system includes:

a learning adaptation parameters sub-system receiving a plurality of training iris samples $\mathcal{L} = \{\theta_1, \theta_2, \ldots, \theta_N\}$ acquired by said at least first and second sensors $\{S_1, S_2, \ldots, S_{Ns}\}$ for a plurality of subjects $\{y_1, y_2, \ldots y_{Nc}\}$, and configured for computing adaptation parameters $\sigma_{ij}$ for said each pair of training iris samples $\theta_i, \theta_j$ from said plurality $\mathcal{L}$ thereof, a similarity measure computation sub-system operatively coupled to said at least second sensor of said verification sub-system to receive therefrom a representation of said test sample, said similarity measure computation sub-system further receiving said plurality of training iris samples, and being configured for generating a similarity measure between said test sample and said plurality of training iris samples, a sensor adaptation sub-system operatively coupled to said similarity measure computation sub-system to receive said similarity measure therefrom and to said learning adaptation parameters sub-system to receive said adaptation parameters therefrom, and configured for computing an adapted kernel matrix $\mathcal{K}^A(\theta_t, \theta)$ for the test iris sample $\theta_t$ and said plurality $\mathcal{L}$ of training iris samples based on said similarity measure and said adaptation parameters; and a matching sub-system coupled to said sensor adaptation sub-system to receive therefrom said adapted kernel matrix $K^A(\theta_t,\theta)$ and to said database of said enrollment sub-system to receive therefrom a representation of said respective enrollment iris sample and configured for computation of a distance measure therebetween in a transformation space, wherein said matching sub-system is further configured to produce a verification for said test iris sample if said distance measure calculated between said test iris sample and said respective enrollment iris sample in the transformation space does not exceed a predetermined threshold.

13. The system of claim 12, wherein said learning adaptation parameters sub-system is further configured to compute a similarity measure $\mathcal{F}(\theta_i,\theta_j)$ for each pair of training iris samples $\theta_i, \theta_j$, to form an initial training kernel matrix $K^0 = \mathcal{F}(\theta_i,\theta_j)$ for said plurality of training iris samples, to iteratively update said initial training kernel matrix $K^0$ by applying Bregman projections at each iteration, thereby forming a final training kernel matrix $K^A(\theta_i, \theta_j)$, and thereby establishing a space of allowable transformations for said training iris samples $\theta_i, \theta_j$ satisfying a predetermined constraint $\mathcal{C}\{\theta_i,\theta_j\}$ imposed between said training iris samples $\theta_i$ and $\theta_j$, to extract adaptation parameters $\sigma_{ij}$ based on said initial and final training kernel matrixes, wherein said similarity measure $\mathcal{F}(\theta_i,\theta_j)$ between said training samples $\theta_i$ and $\theta_j$ is computed as $$\mathcal{F}(\theta_i, \theta_j) = \frac{\eta_A(\theta_i, \theta_j) - \eta_D(\theta_i, \theta_j)}{4\eta(\theta_i, \theta_j)},$$

wherein $\eta_A(\theta_i,\theta_j)$ is the number of valid bits in said training samples $\theta_i$ and $\theta_j$ that agree, $\eta_D(\theta_i,\theta_j)$ is the number of valid bits in said training samples $\theta_i$ and $\theta_j$ that disagree, and $\eta(\theta_i,\theta_j)$ is the number of valid bits in said $\theta_i$ and $\theta_j$ cumulatively.

14. The system of claim 13, wherein said similarity measure computation sub-system is further configured to compute said similarity measure $\mathcal{F}(\theta_t,\theta)$ for said test iris sample $\theta_t$ and said plurality of the training iris samples $\theta \in \mathcal{L}$, to form an initial test matrix $K^0_{test} = \mathcal{F}(\theta_t,\theta)$, wherein said similarity measure $\mathcal{F}(\theta_t,\theta)$ between said test iris sample and each said training iris sample $\theta$ from said plurality $\mathcal{L}$ thereof is computed as:

$$\frac{\eta_A(\theta_t, \theta) - \eta_D(\theta_t, \theta)}{4\eta(\theta_t, \theta)},$$

wherein $\eta_A(\theta_t,\theta)$ is the number of valid bits in said training samples $\theta_t$ and $\theta$ that agree, $\eta_D(\theta_t,\theta)$ is the number of valid bits in said training samples $\theta_t$ and $\theta$ that disagree, and $\eta(\theta_t,\theta)$ is the number of valid bits in said $\theta_t$ and $\theta$ cumulatively.

15. The system of claim 14, wherein said sensor adaptation sub-system is further configured to apply said transforms, wherein said constraints $\mathcal{C}\{\theta_i,\theta_j\}$ constitute at least one constraint selected from a group including: distance preserving constraints, application-specific constraints, inter-sensor constraints, and intra-sensor constraints.

16. The system of claim 15, wherein, in accordance with said distance-preserving constraints, distances between each pair of said training iris samples of said plurality thereof are preserved by said learned transformations, wherein said application-specific constraints $\mathcal{C}(\phi) \leq 0$ are to be satisfied by said learned transformation, and wherein each application specific constraint depends on the constrains being imposed;

wherein, in accordance with said inter-sensor constraints, $\zeta_e(\phi(\theta_i),\phi(\theta_j)) \leq d_u$, if $y_i = y_j$, $s_i \neq s_j$ $\zeta_e(\phi(\theta_i),\phi(\theta_j)) \geq d_l$, if $y_i \neq y_j$, $s_i \neq s_j$;

wherein $d_u$ is the upper distance threshold and $d_l$ is the lowest distance threshold; $\zeta_e(\cdot,\cdot)$ is the squared Euclidean distance, and $\phi(\theta_i)$, $\phi(\theta_j)$ denote transformations applied to $\theta_i$ and $\theta_j$, respectively; and wherein, in accordance with said intra-sensor constraints, $\zeta_e(\phi(\theta_i),\phi(\theta_j)) \leq d_u$, if $y_i = y_j$, $s_i = s_j$ $\zeta_e(\phi(\theta_i),\phi(\theta_j)) \geq d_l$, if $y_i \neq y_j$, $s_i = s_j$.

17. The system of claim 16, wherein said learning adaptation parameters sub-system is further configured to compute the Bregman projections at each iteration $(t+1)^{th}$ by said data processing sub-system as $$K^{t+1} = K^t + \beta_{t+1} K^t e_{t_i} e_{t_j}^T K^t$$

where $K^0 = \mathcal{F}$, $e_{t_i}^T$ is the transpose of the vector $e_{t_i}$, and scalar $\beta_{t+1}$ is computed at each iteration until convergence of said $K^0$ during adaptation, wherein said final training kernel matrix $K^A$ is computed as $$K^A = K^0 + \sum_{(i,j) \in C} \sigma_{ij} K^0 e_i e_j^T K^0$$

wherein said adaption parameters $\sigma_{ij}$ represent the contributions made by the $(i,j)^{th}$ constraint to the final kernel matrix $K^A$.

18. The system of claim 17, wherein said learning adaptation parameters sub-system is further configured to solve said final training kernel matrix as an optimization problem $$K^A = \arg\min_{K \in S} \sum_{\theta_i, \theta_j \in \mathcal{L}} \zeta_d(K_{ii} + K_{jj} - 2K_{ij}, \mathcal{H}(\theta_i, \theta_j))$$

subject to the constraints, $\theta_i, \theta_j \in \mathcal{L}$, $K_{ii} + K_{jj} - 2K_{ij} \geq d_u$, if $y_i = y_j$ $K_{ii} + K_{jj} - 2K_{ij} \leq d_l$, if $y_i \neq y_j$ wherein said $K^A(\theta_i,\theta_j) = \phi^A(\theta_i)^T \phi^A(\theta_j)$ is the adapted kernel matrix corresponding to the optional transformation, and S is the space of all position semi-definite matrices, and each $K_{ii}$, $K_{ij}$, $K_{jj}$ denotes the kernel matrix whose respective $(i,i)^{th}$, $(i,j)^{th}$, or $(j,j)^{th}$ entry is the kernel function between corresponding samples, and wherein $K_{ii} = K(\theta_i,\theta_i)$, $K_{ij} = K(\theta_i,\theta_j)$, $K_{jj} = K(\theta_j,\theta_j)$.

19. The system of claim 12, wherein said matching sub-system is further configured to perform rotation of said test and enrollment iris samples.

20. The system of claim 12, further comprising a cancelable iris code sub-system operatively coupled to at least said enrollment and verification sub-system and configured to divide each of said training iris samples $\theta$, said test iris samples $\theta_t$, and enrollment iris samples into a number of sectors,
- to extract Gabor vector features from each of said sectors,
- to apply Random Projections to said feature vectors of each sector in said plurality thereof,
- to concatenate said Random Projections of said feature vectors, thereby forming a transformed feature vector of said each iris sample,
- to extract cancelable iris code from said transformed feature vector,
- to store said cancelable iris code for said enrollment iris sample in an enrollment database, and
- to match said cancelable iris code of said enrollment iris sample with the cancellable iris code of said test iris sample.

* * * * *